United States Patent [19]

Fujii et al.

[11] 4,363,693
[45] Dec. 14, 1982

[54] FULL-AUTO LABELING SYSTEM

[75] Inventors: Kunihiko Fujii; Yoshihisa Nishiyama, both of Shizuoka, Japan

[73] Assignee: Tokyo Electric Company, Ltd., Tokyo, Japan

[21] Appl. No.: 117,614

[22] Filed: Feb. 1, 1980

[30] Foreign Application Priority Data

May 8, 1979 [JP] Japan .................................. 54-56178
May 21, 1979 [JP] Japan .................................. 54-62505

[51] Int. Cl.³ .......................................... G05G 15/00
[52] U.S. Cl. ..................................... 156/360; 156/384; 364/466; 364/478
[58] Field of Search ....................... 364/567, 466, 478; 53/502; 156/384, 360

Primary Examiner—David A. Simmons

Attorney, Agent, or Firm—Oblon, Fisher, Spivak, McClelland & Maier

[57] ABSTRACT

A full-auto labeling system having sending-in conveyor, a weighing conveyor and a sticking conveyor disposed in alignment, and the respective conveyors provided with sensors for detecting a commodity, so as to control an operation of a load cell with outputs of the sensors providing the basis of an improvement which consists of a load cell periodically operated even when no commodity is being transported, whereby when a measurement value becomes necessary a stable operation can be immediately performed, and that A/D conversion by the load cell is executed twice with a single start signal, a second output being taken as the measurement value, whereby the measurement value of high reliability can be obtained.

6 Claims, 33 Drawing Figures

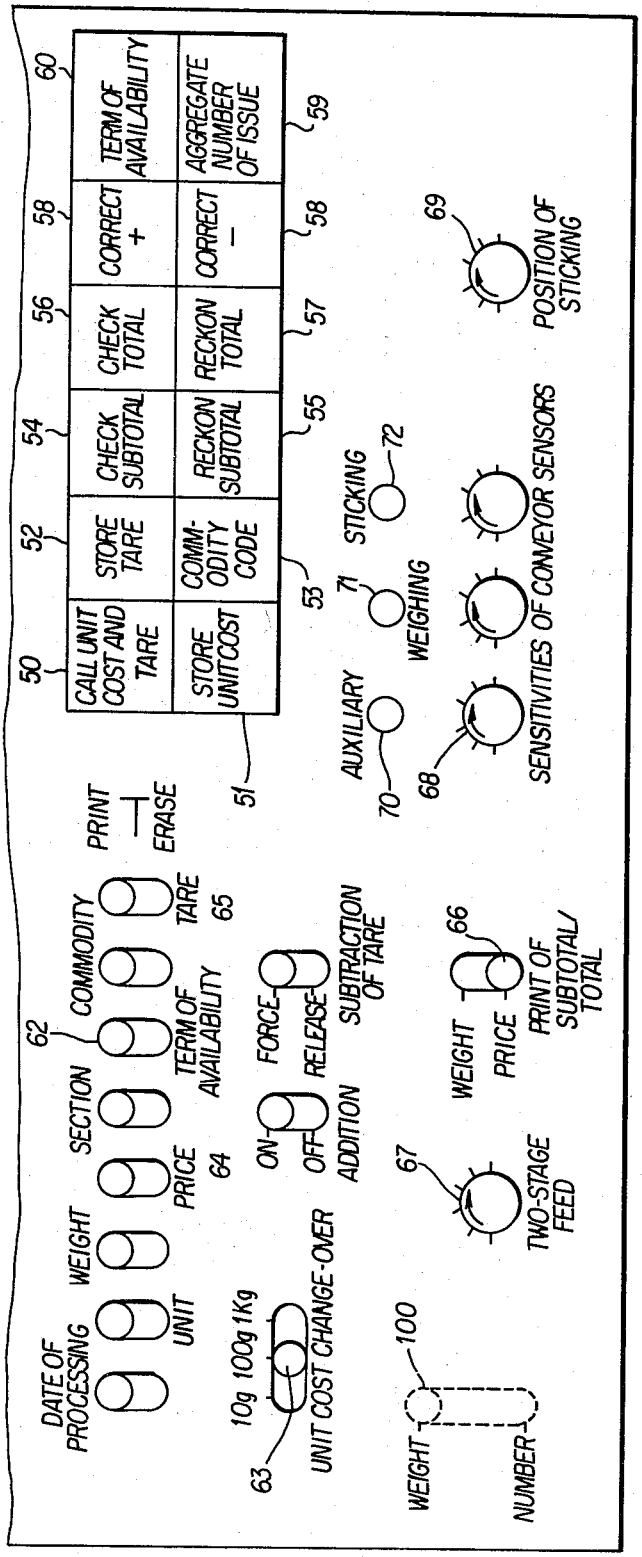
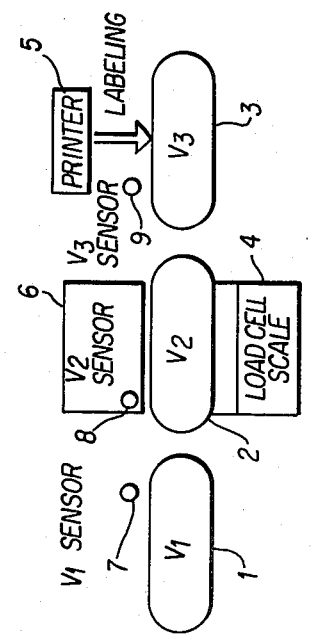
FIG. 2(B)
FIG. 1

| NAME OF ARTICLE | | | | | |
|---|---|---|---|---|---|
| DATE OF PROCESSING | | UNIT COST | WEIGHT | PRICE | SECTION CODE |
| 54  1  31 | | 100 | 200 | 200 | (12) |

| NAME OF ARTICLE | | | | | |
|---|---|---|---|---|---|
| TERM OF AVAILABILITY | | TARE | COMMODITY CODE | | |
| 54  1  31 | | 10 | 150 | | |
| DATE OF PROCESSING | | UNIT COST | WEIGHT | PRICE | SECTION CODE |
| 54  1  31 | | 100 | 200 | 200 | (12) |

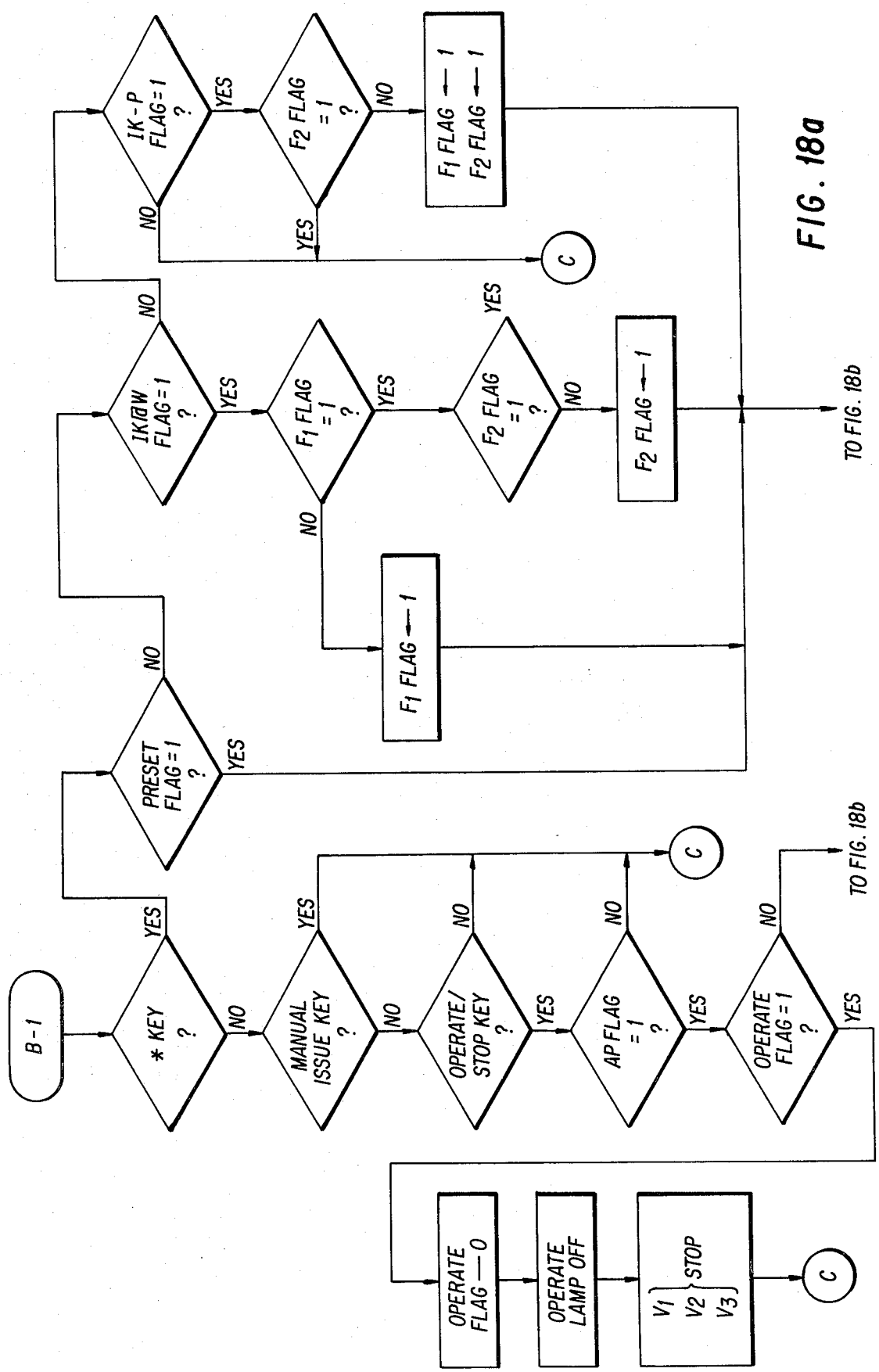

FULL-AUTO LABELING SYSTEM

BACKGROUND OF THE INVENTION

1. Field of the Invention

This invention relates to a full-auto labeling system wherein the weight of a commodity is measured by the use of a load cell and wherein a label on which data based on the measured value is printed is automatically stuck to the commodity.

2. Description of the Prior Art

In a prior-art system of this type therefore having automatic weighing, the weight of a commodity must be measured by a load cell, and hence, the load cell is naturally in the operating state. In this type of automatic weighing, however, the operation of the load cell is stopped when no commodity is being processed. When the operation of the load cell is restarted, some time has lapsed. Since, the operation involves astable factors, it takes a fixed time before the operation is stabilized. Since the load cell is not operated in a print fixing operation, the disadvantages become apparent.

SUMMARY OF THE INVENTION

A first object of this invention is to make it possible to always attain an operating stability by periodically operating a load cell even when no commodity is transported.

A second object of this invention is to make the timings of the flow of a commodity and the weighing thereof in such a way that when the commodity has been sent in, a load cell automatically supplied with operation signals is caused to preferentially perform the stopping and starting operation by the use of outputs of sensors disposed for respective conveyors.

A third object of this invention is to attain an operating stability of a load cell during its reuse thereof by periodically starting the load cell even in a print fixing operation in which weighing data by the load cell is unnecessary.

A fourth object of this invention is to make it possible to enhance reliability by executing the A/D conversion of a load cell twice with a single start signal and storing a signal of the second A/D conversion as weighing data.

A fifth object of this invention is to prevent noise from entering a measured value by updating an A/D converter by a first A/D conversion of a load cell and obtaining weighing data by a second A/D conversion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a side view showing the outline of the construction of an auto labeling system.

FIGS. 19 to 25 show a prior-art load cell, among which:

FIG. 19 is a circuit diagram,

FIG. 20 is an equivalent circuit diagram of the load cell,

FIG. 21 is an equivalent circuit diagram of an integrator input portion at the time when an input voltage is negative, FIG. 22 is an equivalent circuit diagram of an integrator input portion at the time when an input voltage is positive, FIG. 23 shows the operating characteristics of integrators, (a) being a graph at the time when the input voltage is negative, (b) being a graph at the time when the input voltage is positive, FIG. 24 is a graph showing the operating characteristic of an A/D converter, and FIG. 25 is a partial circuit diagram.

DETAILED DESCRIPTION OF THE PREFERRED EMBODIMENTS

Figure 2A:
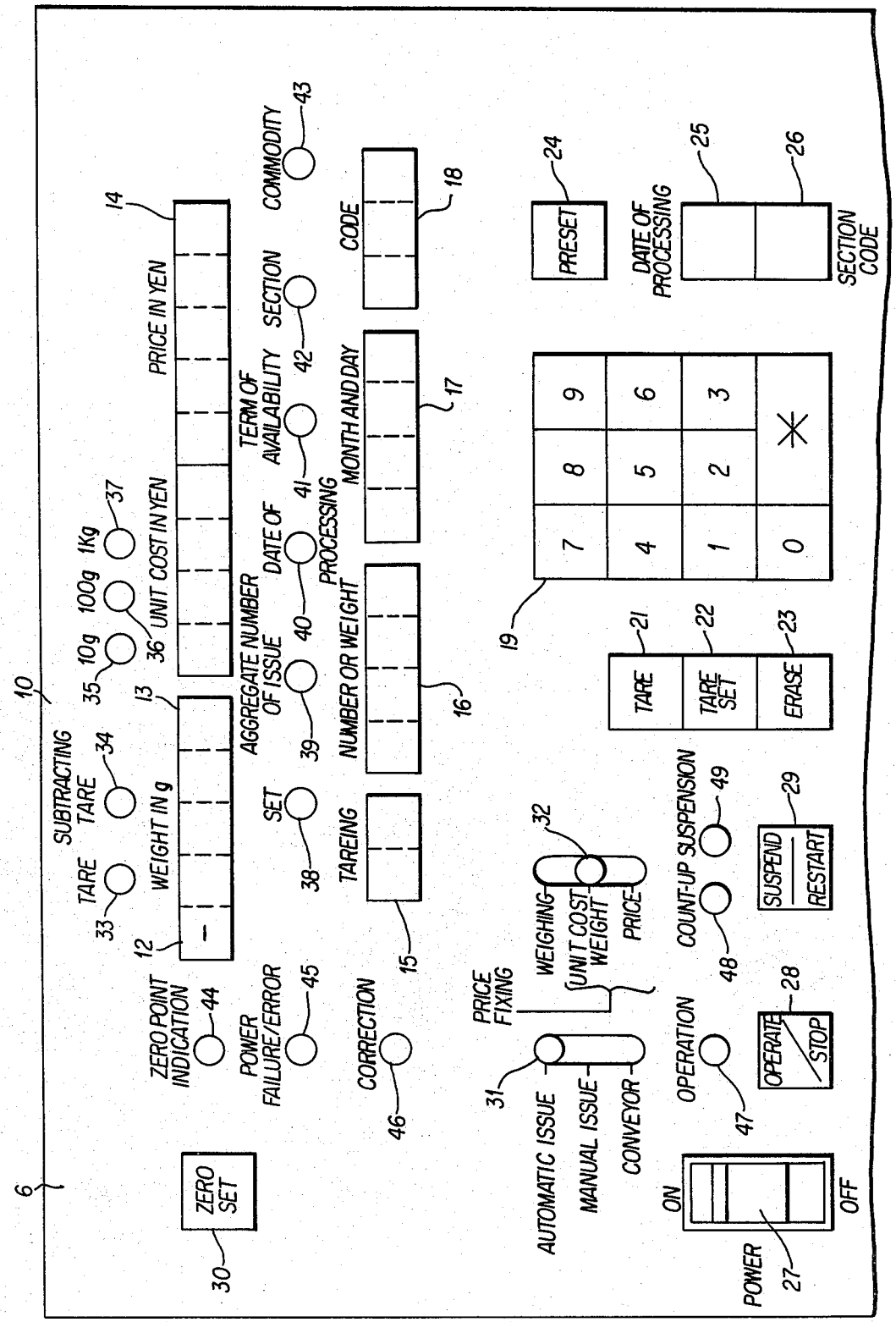
FIG. 2 is a front view of an operation panel.

An embodiment of this invention will be described with reference to FIGS. 1 to 18. Shown in FIG. 1 is a diagram of the general construction of an auto labeling system AL. A conveyor $V_1$ (1), a conveyor $V_2$ (2) and a conveyor $V_3$ (3) are disposed in alignment. The conveyor $V_1$ (1) is a sending-in conveyor for a commodity which is aligned to a packaging machine not shown, the conveyor $V_2$ (2) is a weighing conveyor which is placed on a load cell SL (4) serving as a scale portion, the weight of the commodity being measured with that of the conveyor $V_2$, and the conveyor $V_3$ (3) is a sticking conveyor which sticks a label to the commodity by means of a sticking mechanism of a label printer (5) disposed by the side thereof. By the side of the conveyor $V_2$ (2), an operation unit (6) which is provided with various operating keys and display portions to be stated later is disposed. Over the conveyors $V_1$ (1), $V_2$ (2) and $V_3$ (3), a $V_1$ sensor (7), a $V_2$ sensor (8) and a $V_3$ sensor (9) are respectively disposed to photoelectrically detect the passage of the commodity. The $V_1$ sensor (7) operates to inhibit the transfer of another commodity while the aforecited commodity exists on the conveyor $V_2$ (2). Therefore, the spacing between the $V_1$ sensor (7) and the $V_2$ sensor (8) is set at an interval enough to perform one weighing.

Now, the construction of an operation panel (10) of the operation unit (6) will be described with reference to FIG. 2. In the upper part of the operation panel (10), display tubes (11) divided into two stages are disposed. The upper stage of the display tubes (11) is subdivided into a weight display portion (12), a unit cost display portion (13) and a price display portion (14), while the lower stage is subdivided into a tare display portion (15), a number or weight display portion (16), a month and day display portion (17) and a code display portion (18). Below and on the left of such display tubes (11), there are disposed numeral keys of 0-9 (19), an execute key (20), a tare key (21), a tare set key (22), an erase key (23), a preset key (24), a date-of-processing key (25), a section code key (26), a power switch (27), an operate/stop key (28), a suspend—restart key (29) and a zero set key (30). A change-over switch (31) is disposed which effects change-over among automatic issue, manual issue, and conveyor continuous running, while a change-over switch (32) is disposed which effects change-over among weighing, print fixing for unit cost and weight, and print fixing for price. Further, there are disposed various lamps which indicate the items or operating states of display contents respectively. These lamps are a "taring" lamp (33), a "subtracting tare" lamp (34), a 10 gr lamp (35), a 100 gr lamp (36) and a 1 Kg lamp (37), the lamps (35) to (37) indicating the standards of unit costs, a set lamp (38), an "aggregate number of issue" lamp (39), a "date of processing" lamp (40), a "term of availability" lamp (41), a section lamp (42), a commodity lamp (43), a zero point indication lamp (44), a power failure/error lamp (45), a correction lamp (46), an operation lamp (47), a count-up lamp (48) and a suspension lamp (49). On the other hand, in the lower part of the operation panel (10), there are disposed a unit cost and tare calling key (50), a unit cost storing key (51), a tare storing key (52), a commodity code key (53), a subtotal check key (54), a subtotal reckon key (55), a total check key (56), a total reckon key (57), a correct-+key (58), a correct—key (59), a "term of availability" key (60) and an "aggregate number of issue" key (61). On the left of them, eight print control switches (62) are disposed which set whether the date of processing, unit cost, weight, price, section, term of availability, commodity are tare are to be printed or erased. Disposed below the print control switches (62) are a unit cost change-over switch (63) which sets the standard value of the unit cost display portion (13), an addition switch (64) which makes an addition control, a tare subtraction forcing switch (65) which controls the subtraction of tare, and a subtotal/total print switch (66) which changes-over the print of subtotal/total between the weight and price. Further, there is disposed a two-stage print switch (67) which sets the print for the label to either one-stage print or two-stage print and which adjusts the amount of feed at the two-stage print, three sensitivity adjustment knobs (68) which adjust the sensitivities of the respective sensors, and a sticking position adjustment knob (69) which adjusts the label sticking position of the commodity. An auxiliary lamp (70), a weighing lamp (71) and a sticking lamp (72) are disposed in correspondence with the sensitivity adjustment knobs (68).

The (100) indicates a preset content change-over switch which effects change-over between weight preset and number preset and which is mounted inside the operation unit (6).

Figure 3:
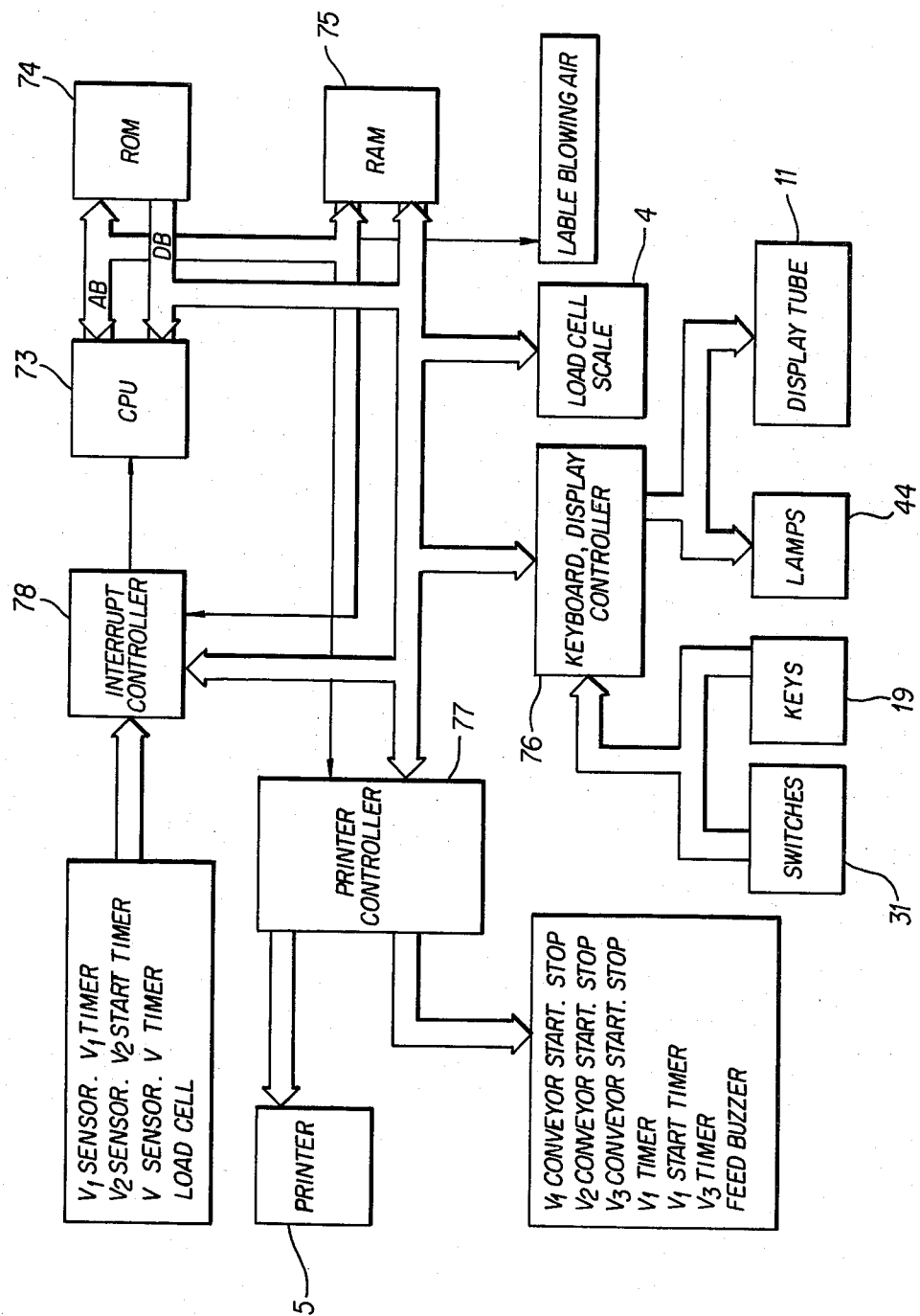
FIG. 3 is a block diagram of electronic circuitry.

Referring now to FIG. 3, electronic circuitry disposed in the operation unit (6) will be described. A central processing unit (73) (hereinbelow, termed CPU (73)) is disposed, to which a ROM (74), a RAM (75), the load cell SL (4), a keyboard display controller (76), a printer controller (77) and an interrupt controller (78) are respectively connected. The keyboard display controller (76) has the switch (31) and other various switches and the numeral keys (19) and other various keys connected thereto, and is connected to the zero point indication lamp (44) and other various lamps and the display tubes (11). The printer controller (77) has the label printer (5) connected thereto, and is connected to various control portions for the start/stop of the conveyor $V_1$ (1), the start/stop of the conveyor $V_2$ (2), the start/stop of the conveyor $V_3$ (3), a $V_1$ timer, a $V_1$ start timer, a $V_3$ timer, feed, and a buzzer. Further, the $V_1$ sensor (7), the $V_2$ sensor (8), the $V_3$ sensor (9), the $V_1$ timer, the $V_1$ start timer, the $V_3$ timer, and the load cell SL (4) are connected to the interrupt controller (78).

Figure 4:
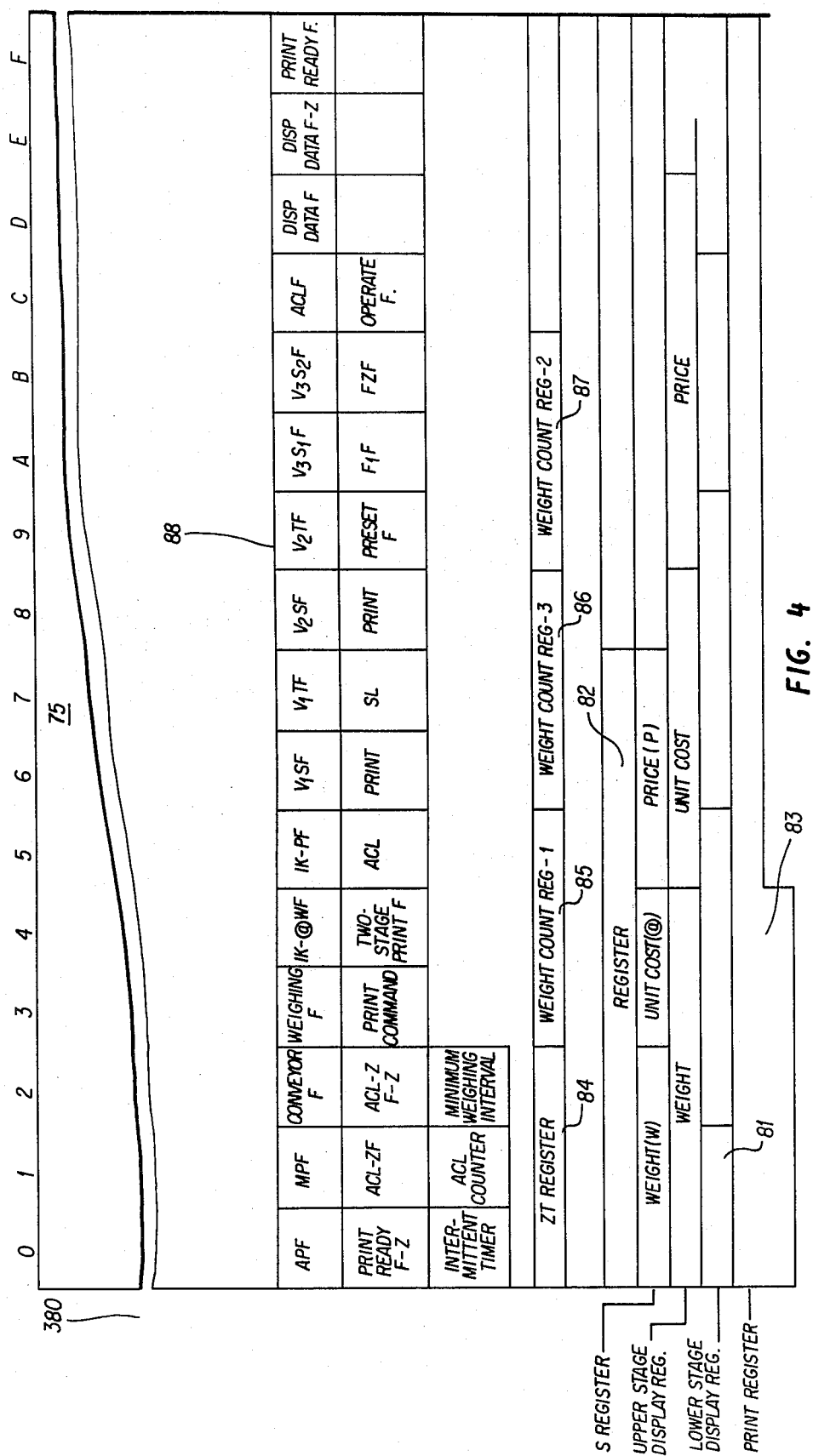
FIG. 4 is a RAM map.

FIG. 4 shows a RAM map. It includes an S register (79) which stores weight, unit cost and price, an upper-stage display register (80) and lower-stage display register (81) which stores and displays them, a register (82), a print register (83), a ZT register (84), a wait count register-1 (85), a wait count register-3 (86) and a wait count register-2 (87). In the upper part, flag columns (88) are provided. In these flag columns (88), there are set an automatic issue flag APF, manual issue flag MPF, conveyor flag F, weighing F, print fixing flag for unit cost and weight IK-@WF, print fixing flag for price IK-PF, $V_1$ sensor (7) flag $V_1$SF, $V_1$ timer flag $V_1$TF, $V_2$SF, $V_2$TF, $V_3S_1F$, $V_3S_2F$, auto-zero flag ACLF, display data F, display data F-2, print ready F, print ready-2F, ACLF-2, ACL-2F-2, print command F, two-stage print F, ACL end F, print data-1F, SL start F, print data-2 F, print set F, F1F, F2F, operating F, intermittent timer F, ACL counter, minimum weighing interval F, etc.

Figure 5:
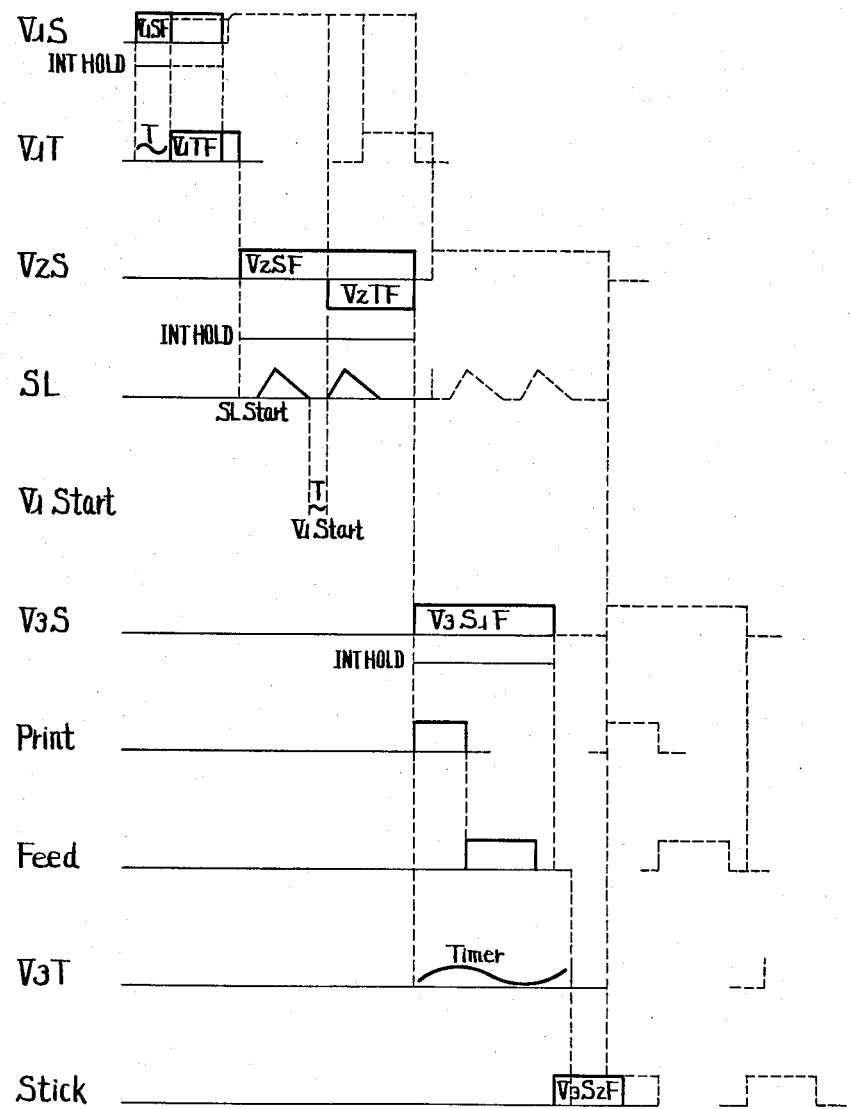
FIG. 5 is a timing chart in the case of one-stage print.
Figures 6, 8, 11:
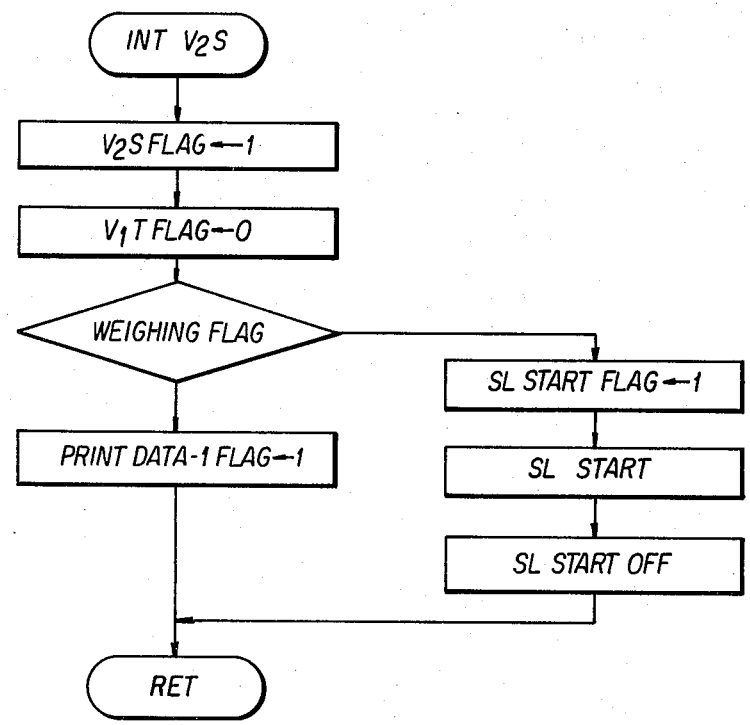
FIG. 6 is a plan view of a label obtained by the one-stage print.
FIG. 8 is a plan view of a label obtained by the two-stage print.
FIG. 11 is a flow chart of the interrupt of a $V_2$ sensor.

Referring now to FIG. 5, there will be described the timings of various portions in the case of issuing a label of one-stage print (89) as shown in FIG. 6. The prints at this time are the date of processing, unit cost, weight, price, section code, etc. When the $V_1$ sensor (7) (indicated as $V_1$S) has detected the commodity, $V_1$SF is erected, and simultaneously, the $V_1$ timer ($V_1$T) sets a fixed time T, whereupon $V_1$TF is erected. Upon the time-up of $V_1$T, $V_1$SF=0 holds, and when the $V_2$ sensor (8) has detected the commodity, $V_2$SF is erected and simultaneously the load cell SL (4) is started. The conveyor $V_1$ (1) is started by the first signal of the load cell SL (4), and simultaneously, $V_2$SF=0 is established and $V_2$TF is erected. The load cell SL (4) is set so as to infallibly generate the second signal, and the storage of the weighing data and other necessary operations are performed with the second signal. Subsequently, when the commodity has been detected by the $V_3$ sensor (9) ($V_3$S), it is simultaneously carried out to erect $V_3S_1F$, to initiate the print operation and to start the $V_3$ timer ($V_3$T). In a set time by the $V_3$ timer, the label feed is executed at the same time as the termination of the print. After the label feed has terminated, the label is stuck (at Stick) upon the set-up of the $V_3$ timer subject to $V_3S_2F=1$ which is formed by a main routine to be stated later. A part indicated as INT HOLD signifies that various interruptions to be stated later are executed.

Figure 7:
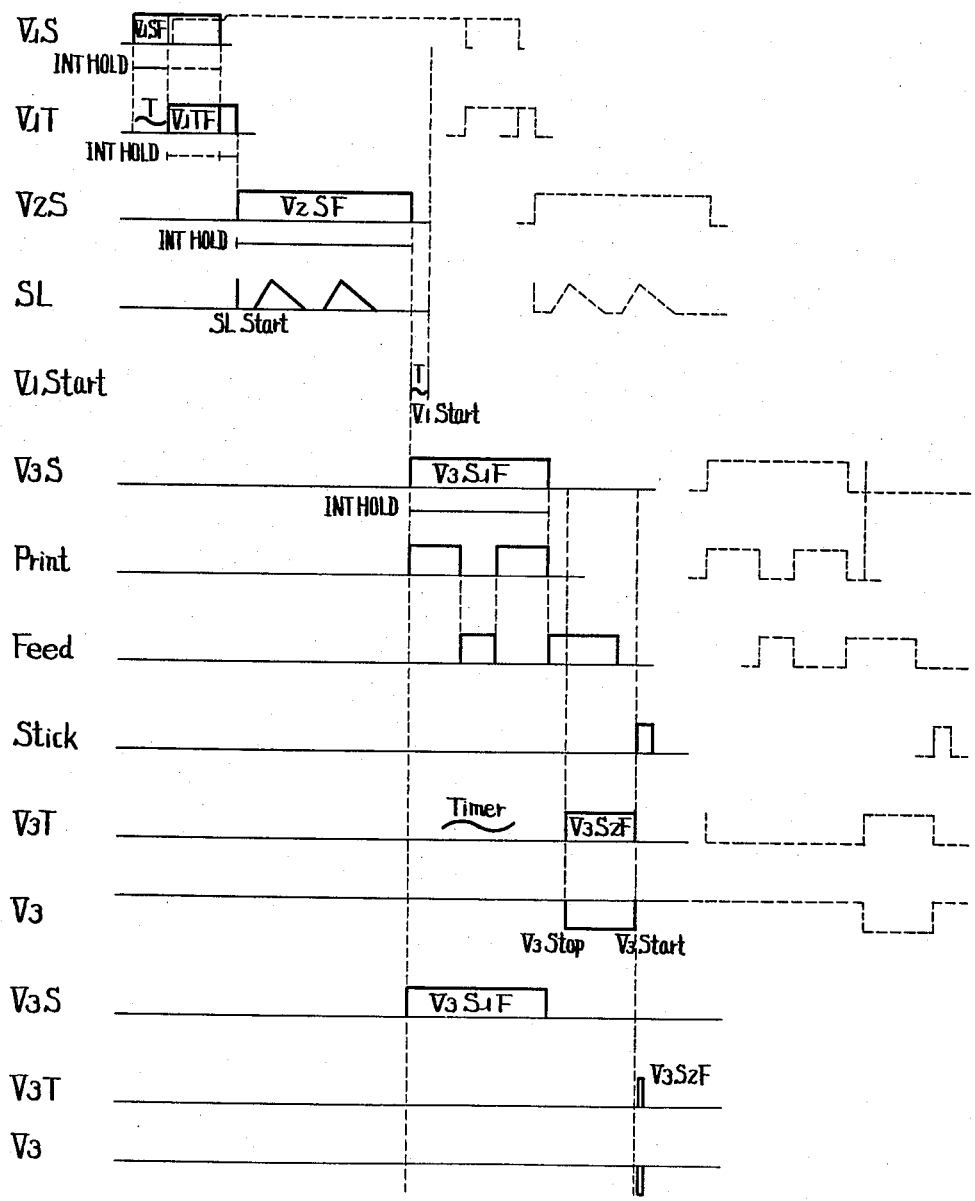
FIG. 7 is a timing chart in the case of two-stage print.

Referring now to FIG. 7, there will be described the timings of various portions in the case of issuing a label of two-stage print (90) as shown in FIG. 8. The prints at this time include the term of availability, tare, commodity code etc. printed at the second stage, besides the one-stage print described previously. The state from the commodity detection by the $V_1$ sensor (7) to the load cell SL (4) start is the same as shown in FIG. 5. The start of the conveyor $V_1$ (1) is executed upon lapse of the time T after $V_2SF=0$ has been established. When the $V_3$ sensor (9) has detected the commodity, $V_3S_1F=1$ is established to start the $V_3$ timer, and simultaneously, the first stage print is made, the first stage feed is made, the second stage print is made and the second stage feed is made. When the $V_3$ timer has timed up before the end of these operations, the arrival of the commodity at a label sticking position is indicated, and $V_3S_2F$ is erected to stop the conveyor $V_3$ (3). Since, at the time of the end of the second stage feed, the labeling has gotten ready, the labeling (STICK) is made after a fixed period from the time, and $V_3S_2F=0$ is established to restart the conveyor $V_3$ (3).

When, in the two-stage feed state, the $V_3$ timer does not set up by any cause, the conveyor $V_3$ (3) is not stopped and the continuous running is kept. However, at the time when the $V_3$ timer has set up later, the label is stuck under the running state of the conveyor $V_3$ (3).

Figures 9, 10:
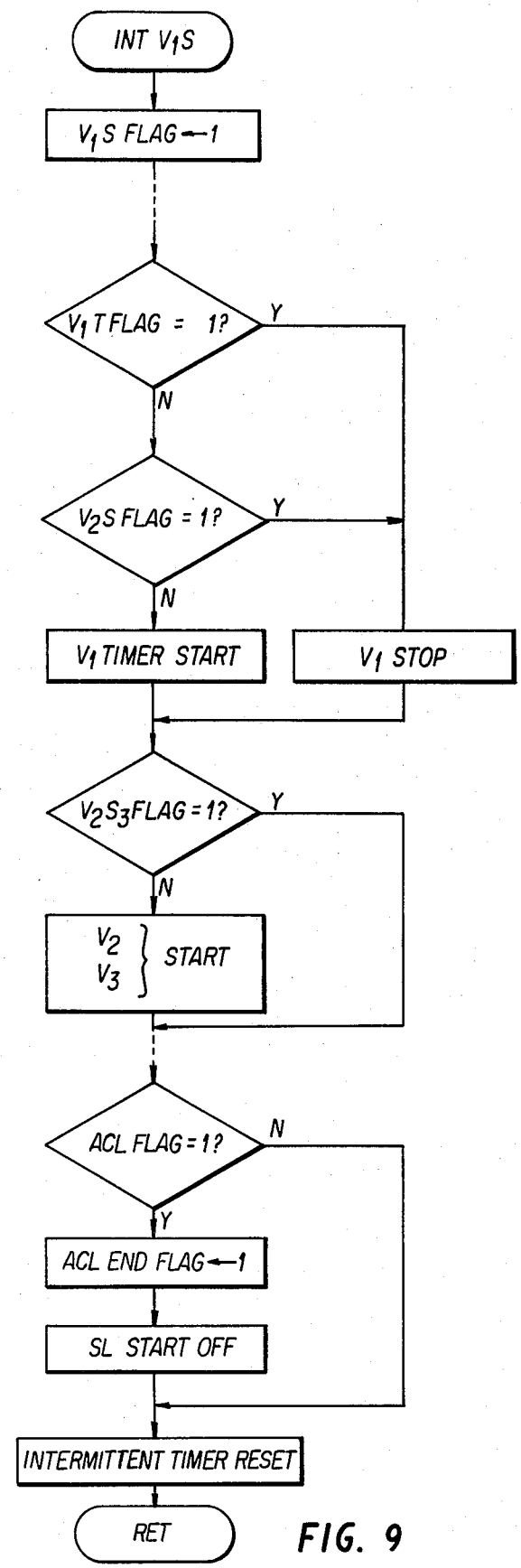
FIG. 9 is a flow chart of the interrupt of a $V_1$ sensor.
FIG. 10 is a flow chart of the interrupt of a $V_1$ timer.

The various interrupting operations will be described with reference to FIGS. 9 to 15. First, FIG. 9 shows the interrupt INT $V_1S$ of the $V_1$ sensor (7). Under this state, $V_1SF=1$ is established, and a check as to whether $V_1TF=1$ and a check as to whether $V_2SF=1$ are successively performed. When either stands erect, the conveyor $V_1$ (1) is stopped, and when neither stands erect, the $V_1$ timer is started. Subsequently, the check of $V_3S_2F$ as to whether the $V_3$ sensor (9) is detecting the commodity is made. When $V_3S_2F=0$ holds, the conveyor $V_2$ (2) and the conveyor $V_3$ (3) are started. When $V_3S_2F=1$ holds, the starts of the conveyor $V_2$ (2) and the conveyor $V_3$ (3) are jumped, and ACLF as to whether the auto-zero state holds is checked. When ACLF=0 holds, the intermittent timer is reset, and a return is made. When ACLF=1 holds, the ACL end F=1 is established and the load cell SL (4) start is turned "off", whereupon the intermittent timer is reset and the return is made.

Next, FIG. 10 shows the interrupt of the $V_1$ timer. When this has been received, $V_1TF=1$ is established, $V_1SF=0$ is established, the $V_1$ timer is reset and INT $V_1S$ is reset.

FIG. 11 shows the interrupt of the $V_2$ sensor (8). When this has been received, $V_2SF=1$ is established and $V_1TF=0$ is established, whereupon the weighing F is checked. If the weighing F=1, the print data 1F=1 is established, the load cell SL (4) is started and a return is made. If the weighing F=0, the SL start F=1 is established, the load cell SL (4) is started and then turned "off", and the return is made. Also in the case of the print fixing, accordingly, the load cell SL (4) is also started for to the automatic weighing operation, whereby the start timings of the various works are made quite similar to those of the automatic weighing.

Figure 12:
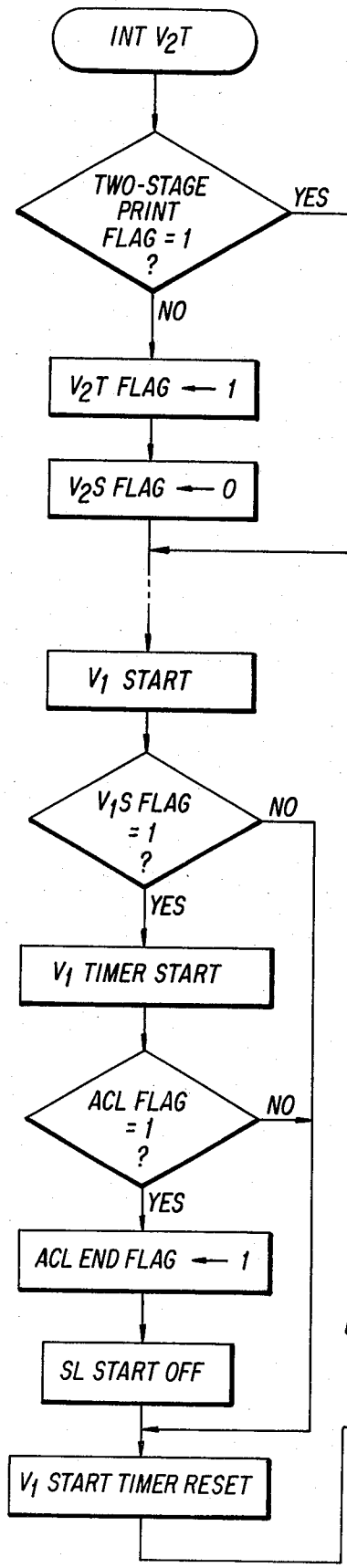
FIG. 12 is a flow chart of the interrupt of a $V_2$ timer.

Further, FIG. 12 shows the interrupt of the $V_2$ timer. At this time, the two-stage print F is checked as to whether the two-stage print switch (67) turns "on". In case of the two-stage print, the conveyor $V_1$ (1) is started in accordance with the commodity detection state of the $V_3$ sensor (9) to be stated later, while in case of the one-stage print, $V_2TF=1$ is established, $V_2SF=0$ is established and then the conveyor $V_1$ (1) is started. Thereafter, $V_1SF$ is checked. When $V_1SF=0$ holds, the $V_1$ start timer is reset and a return is made, and when $V_1SF=1$ holds, the $V_1$ timer start is made and ACLF is checked. When the auto zero is not indicated, the $V_1$ start timer is reset and the return is made as described previously. When ACLF=1 holds, the ACLF end F=1 is established and the load cell SL (4) is started and turned "off", whereupon the $V_1$ start timer is reset and the return is made.

Figure 13:
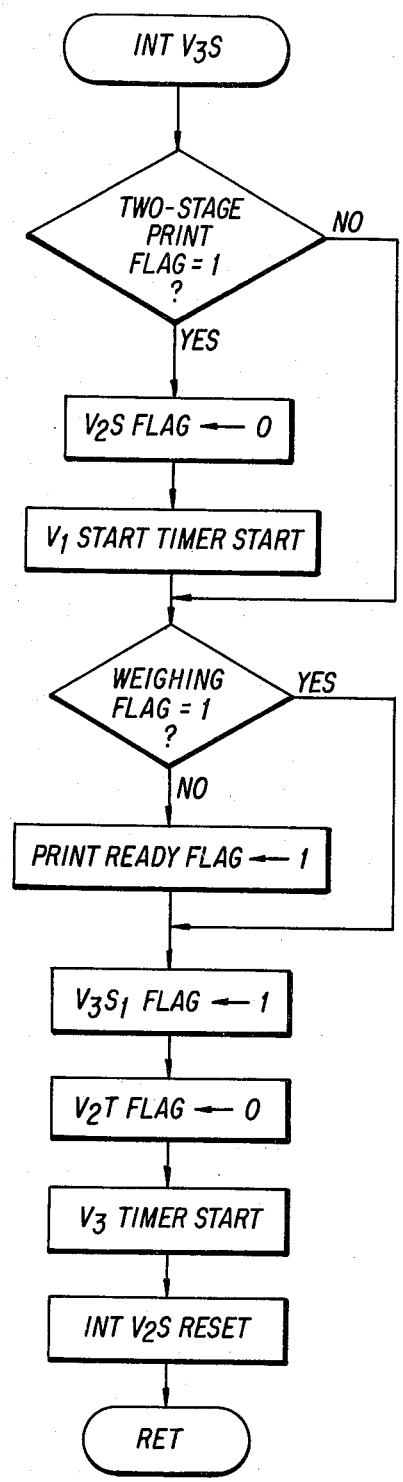
FIG. 13 is a flow chart of the interrupt of a $V_3$ sensor.

FIG. 13 shows the interrupt of the $V_3$ sensor (9). When this has been received, the two-stage print F is checked. If the two-stage print F=1, $V_2SF=0$ is established and the $V_1$ start timer is started, and if the two-stage print F=0, they are jumped and the weighing F is checked. If the weighing F=0 holds, the print ready F is erected, and if the weighing F=1 holds, it is jumped, $V_3S_1F=1$ is established, $V_2TF=0$ is established, the $V_3$ timer is started, INT $V_2S$ is reset and a return is made.

Figure 14:
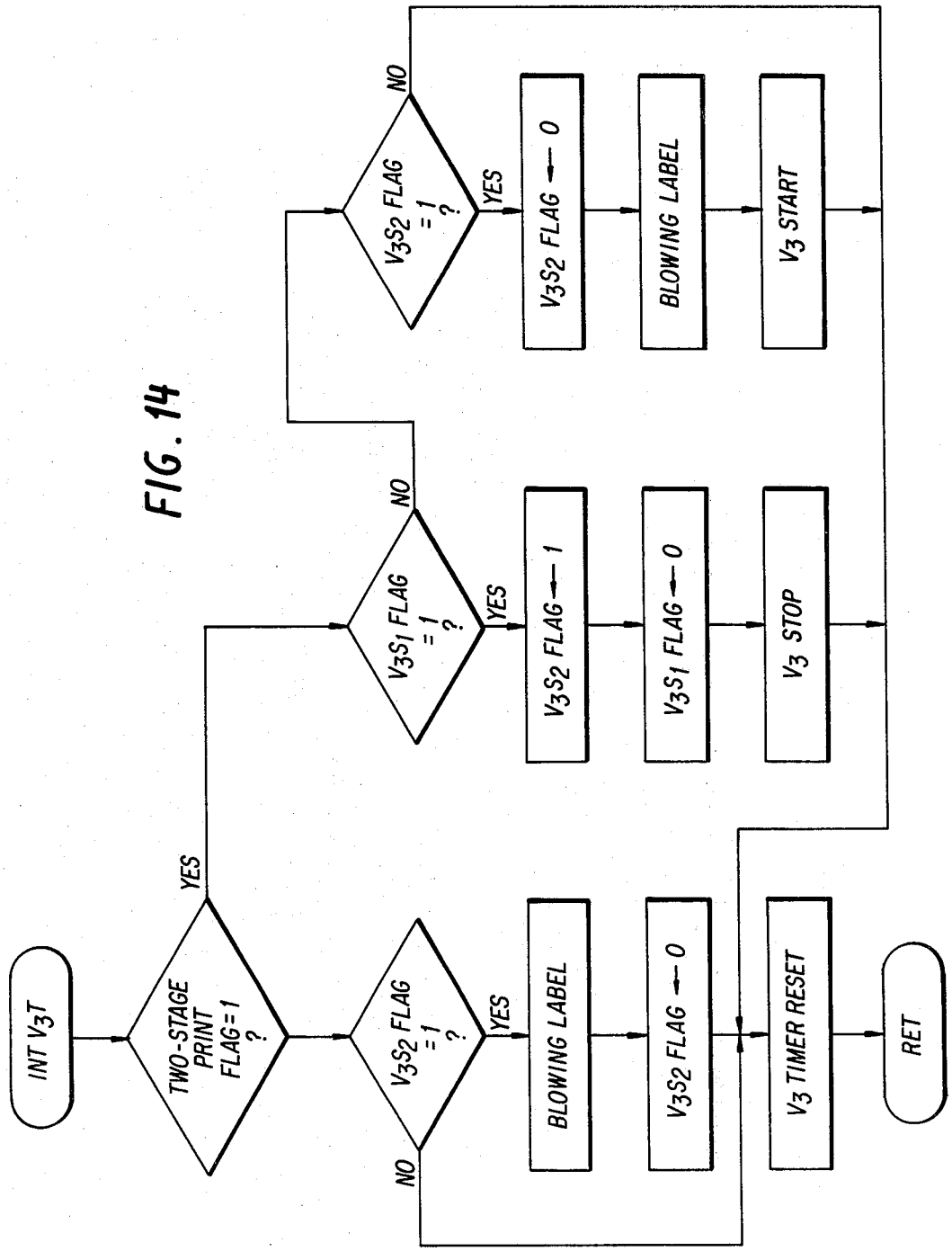
FIG. 14 is a flow chart of the interrupt of a $V_3$ timer.

FIG. 14 shows the interrupt of the $V_3$ timer. When this has entered, the two-stage print F is checked. When the two-stage print F=0 significant of the one-stage print state holds, the label is blown at $V_3S_2F=1$, to establish $V_3S_2F=0$. When $V_3S_2F=0$ holds, the $V_3$ timer is directly reset and a return is made. Subsequently, in case of the two-stage print state, that is, when the two-stage print F=1 holds, $V_3S_1F$ is checked. When $V_3S_1F=1$ holds, it is meant that the label issue has not been readied. At this time, $V_3S_2F=1$ is established, $V_3S_1F=0$ is established, the conveyor $V_3$ (3) is stopped, the $V_3$ timer is reset and thereafter the return is made. On the other hand, if $V_3S_1F=0$ holds, $V_3S_2F$ is checked. If $V_3S_2F=1$ holds, $V_3S_2F=0$ is established, whereupon the label is blown, the conveyor $V_3$ (3) is started, the $V_3$ timer is reset and the return is made.

Figure 15A:
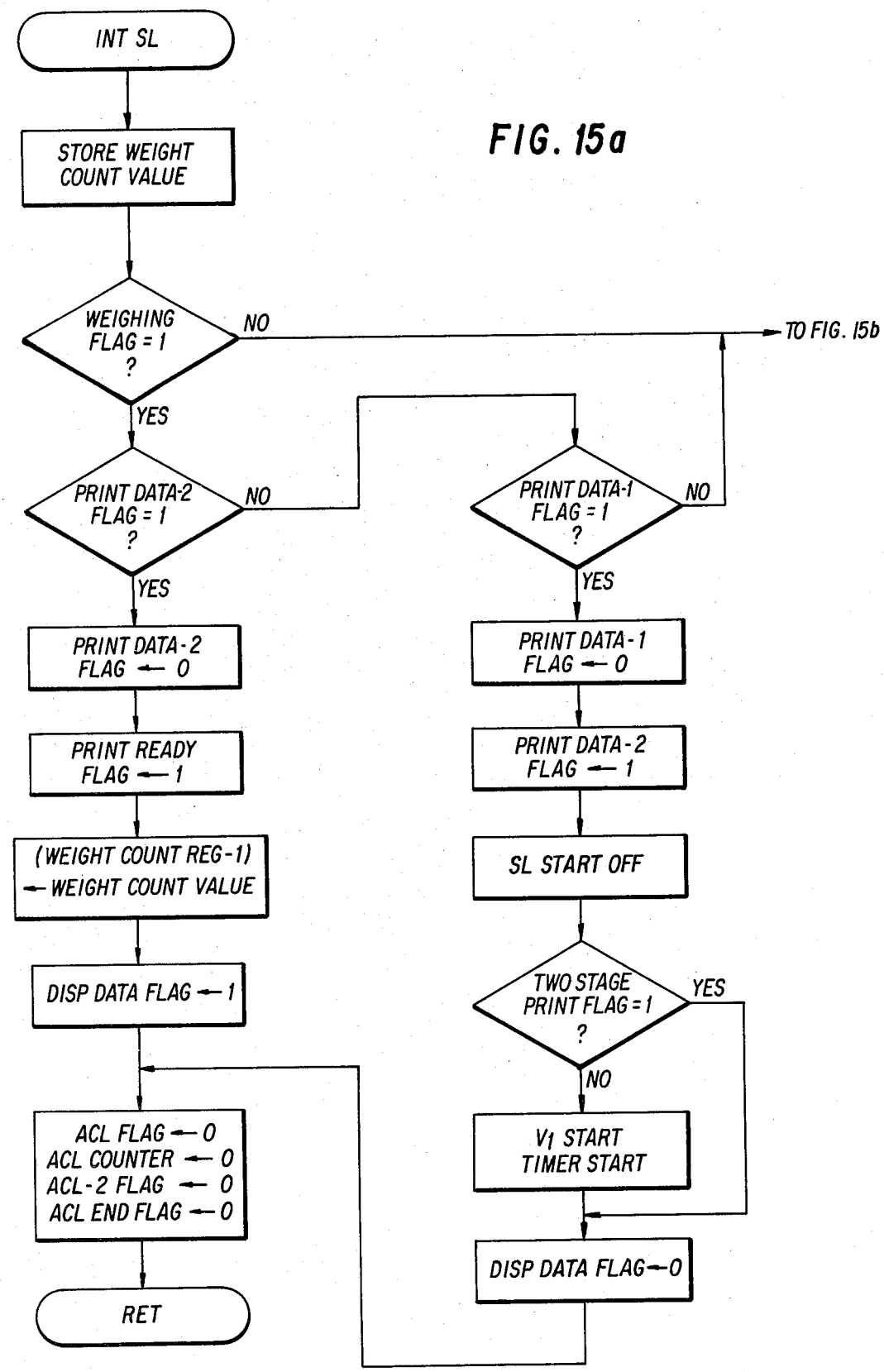
FIG. 15 is a flow chart of the interrupt of a load cell SL.
Figure 15B:
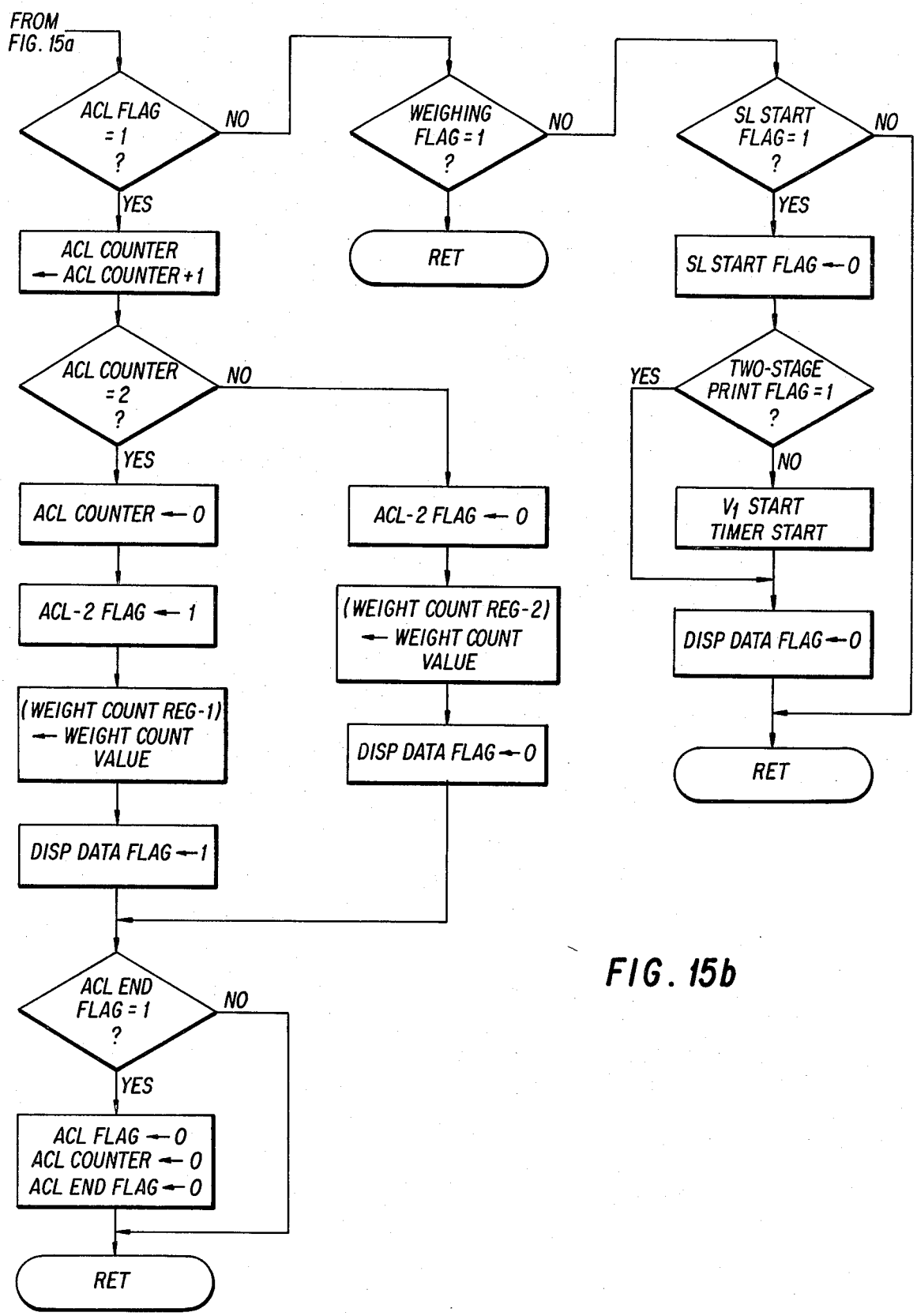
Figure 16A:
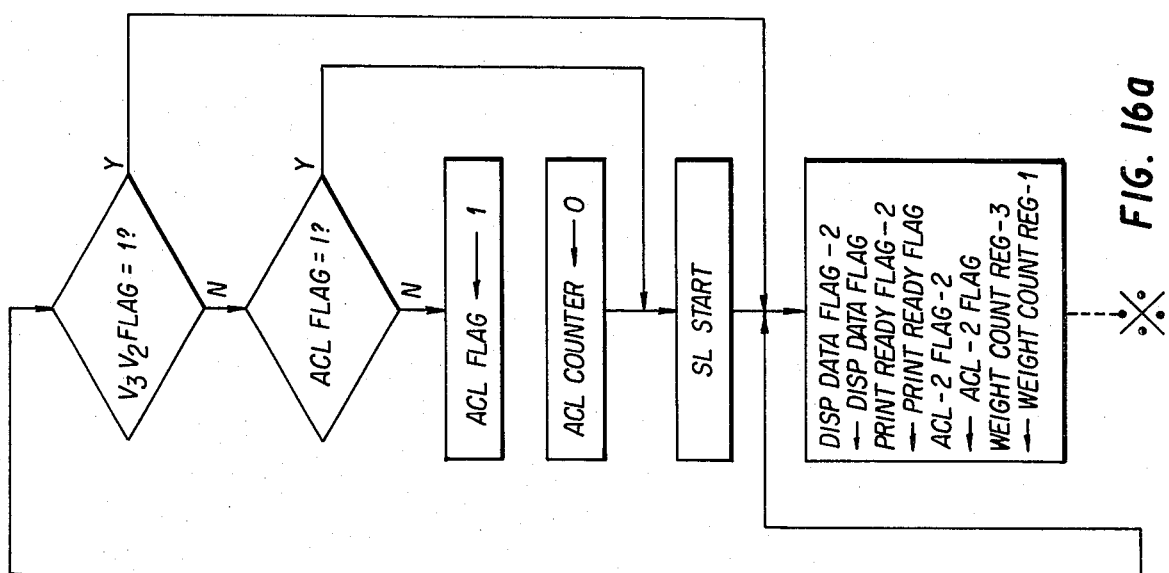
FIGS. 16 to 18 are flow charts of the main flow.
Figure 16A:
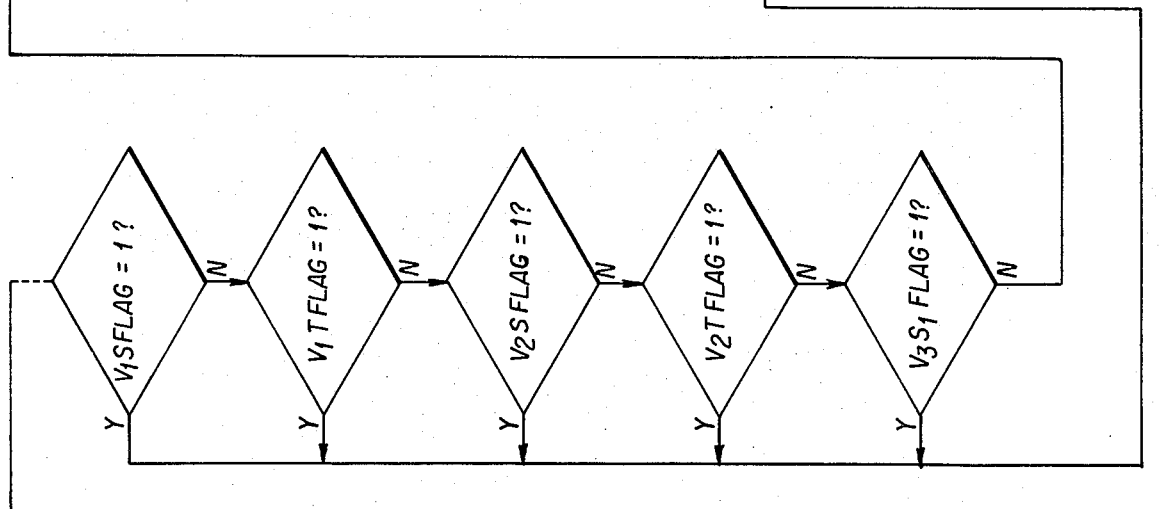
Figure 16A:
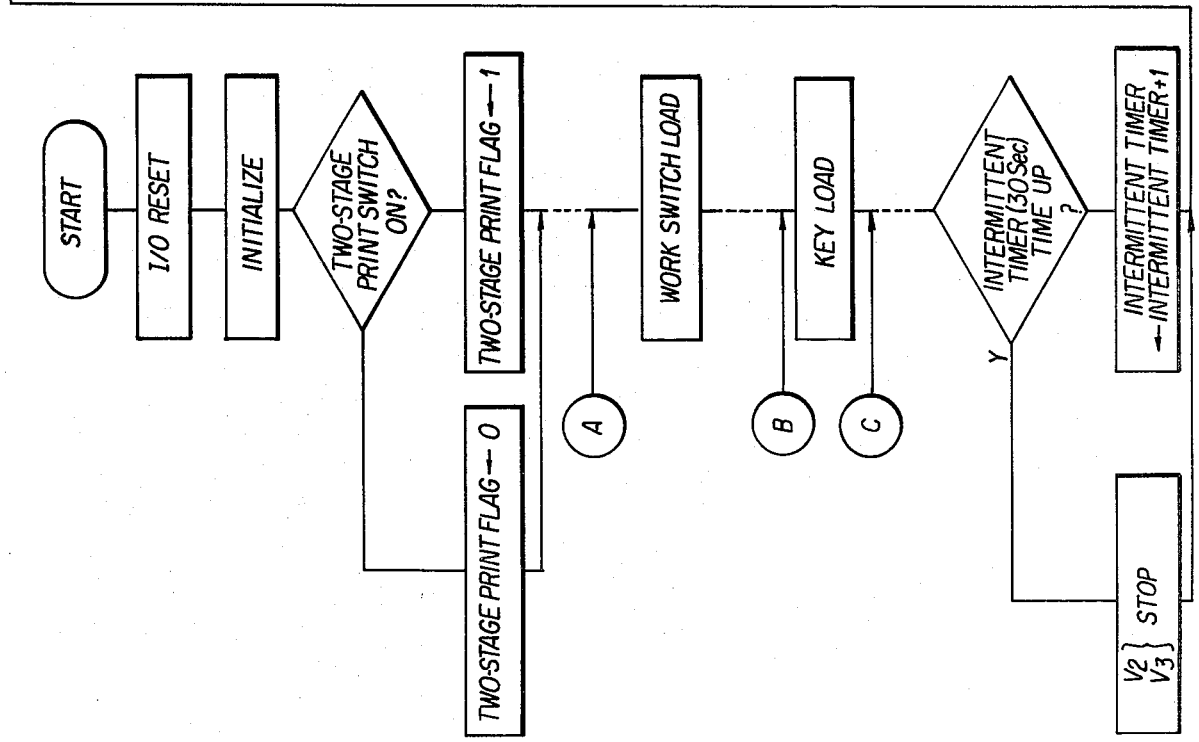
Figure 16B:
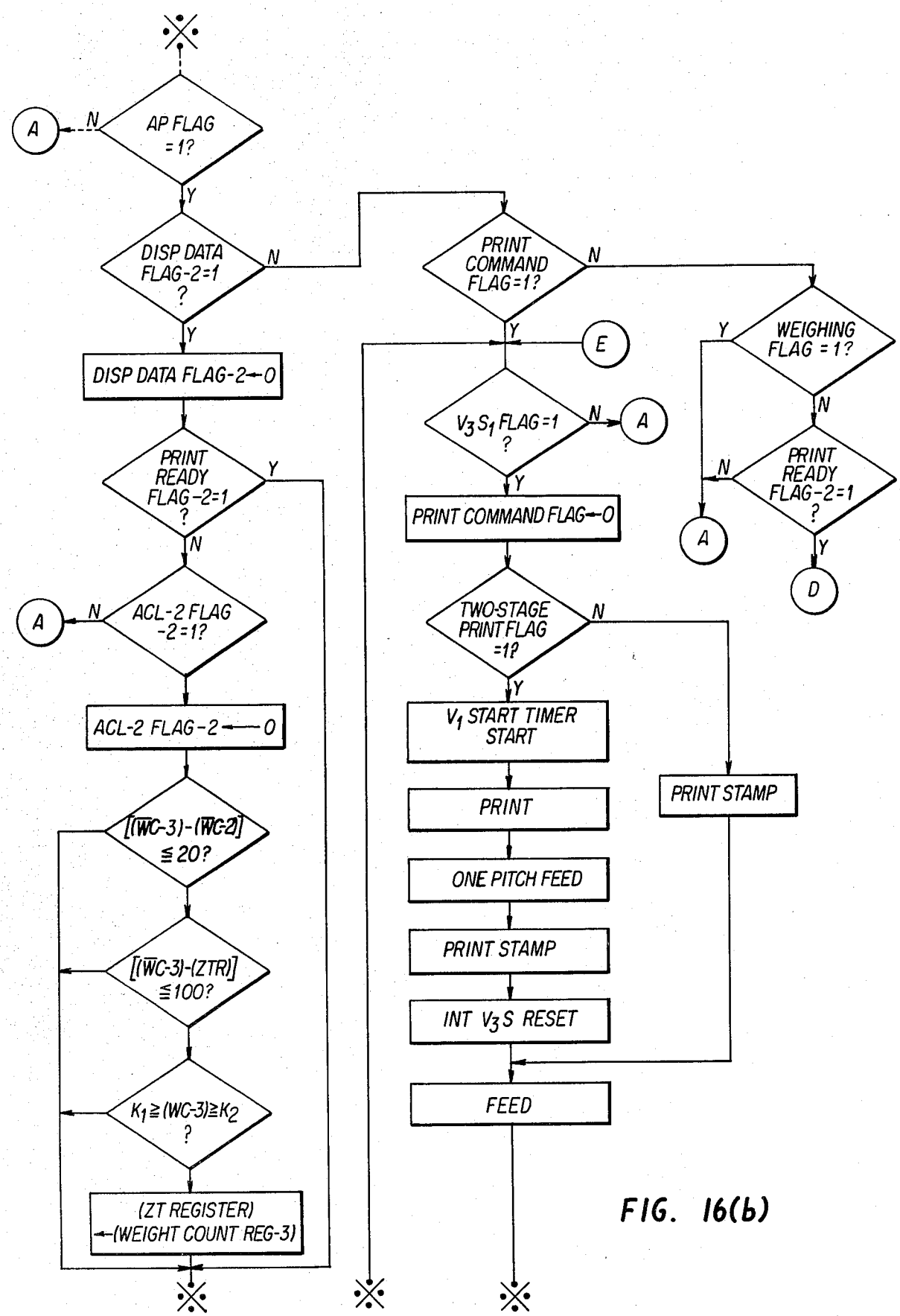
Figure 16C:
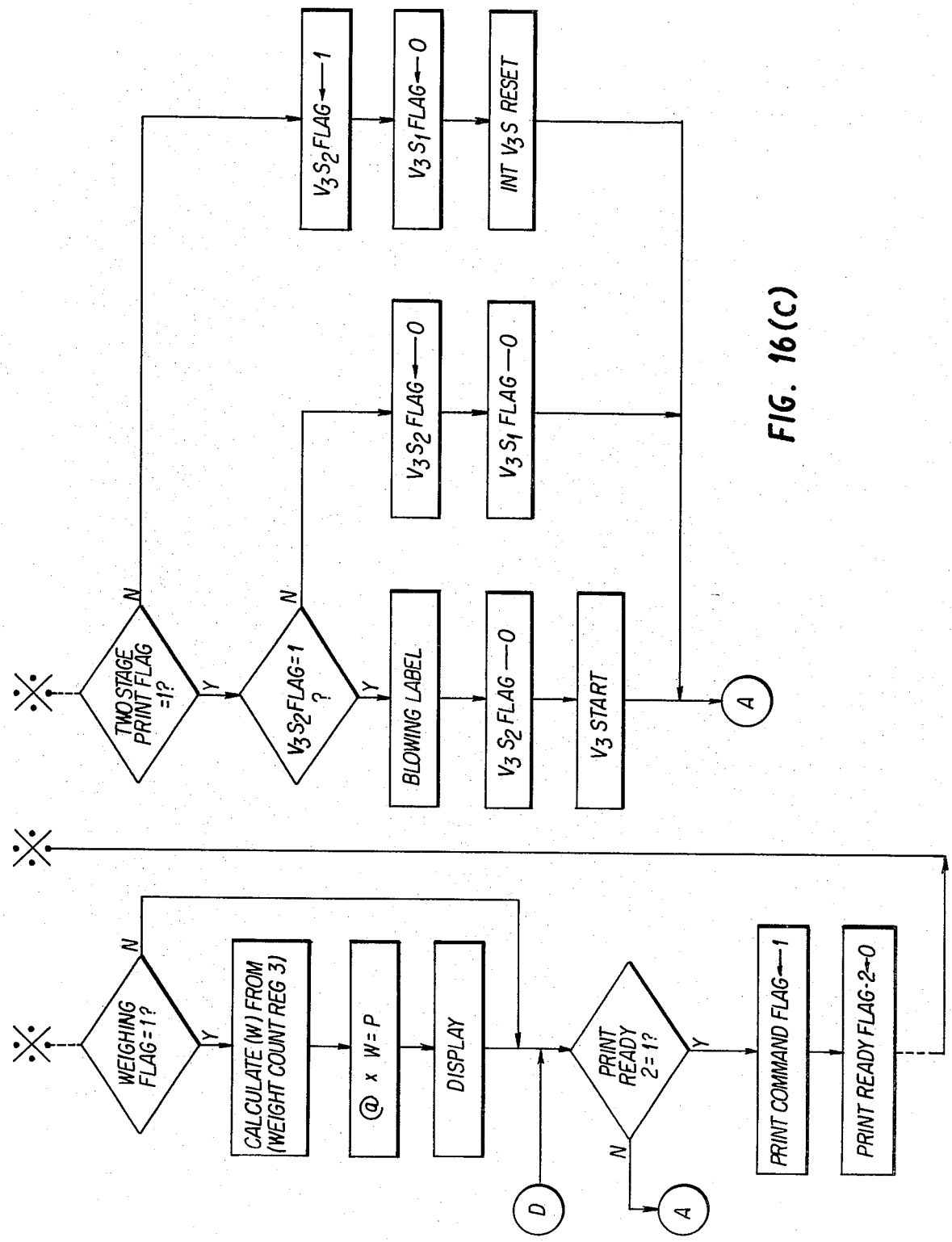

Referring now to FIG. 15, the interrupt of the load cell SL (4) will be described. After the start of the load cell SL (4), the weight count value is stored. Subsequently, the weighing F is checked. If the weighing F=1 holds, the print data-2 F is checked. If the print data-2 F=1 holds, it is first made zero, the print ready F=1 is established, the weight count value is put into the weight count register-1 (85), the display data F=1 is established, ACLF=0, ACL counter=0, ACL-2 F=0 and ACL end F=0 are established, and a return is made. On the other hand, if the aforecited print data-2 F=0 holds, the print data-1 F is checked. if the print data-1 F=1 holds, it is made zero, the print data-2 F=1 is established, and the load cell SL (4) is started and turned "off". When the two-stage print F=0 holds, the $V_1$ start timer is started, and when the two-stage print F=1 holds, it is jumped, the display data F=0 is established, and the return is made after establishing ACLF=0, ACL counter=0, ACL-2 F=0 and ACL end F=0 as stated previously.

Further, when the aforecited print data-1 F=0 or the aforecited weighing F=0 holds, ACLF is checked. If ACLF=1 holds, the ACL counter is subjected to +1, and whether ACL counter=2 holds is checked. If the ACL counter=2 holds, the ACL counter is made zero, ACL-2 F=1 is established, the weight count value is put into the weight count register-1 (85), and the display data F=1 is established. Unless the ACL counter=2 holds, ACL-2 F=0 is established, the weight count value is put into the weight count register-2 (87), and the display data F=0 is established. Subsequently, the ACL end F is checked. If the ACL end F=0 holds, the return is directly made, and if the ACL end F=1 holds, the return is made after establishing ACLF=0, ACL counter=0 and ACL end F=0.

Further, when ACLF=0 holds at the foregoing check of ACLF, the check of the weighing F is conducted again. If the weighing F=1 holds, the return is directly made, and if the weighing F=0 holds, the SL start F is checked. If SL start F=0 holds, the return is made, and if SL start F=1 holds, it is made zero, whereupon the two-stage print F is checked. If the two-stage print F=0 holds, the V₁ start timer is started, and if the two-stage print F=1 holds, it is jumped, the display data F=0 is established and the return is made. Such facts signify that, even in the case of the print fixing, the timings of the various works are set with reference to the start of the load cell SL (4).

Now, the main flow will be described with reference to FIGS. 16 to 18. In FIG. 16, after closing the power switch (27), an I/O is reset and the various portions are initialized, and whether or not the two-stage print switch (67) turns "on" is checked. The flow reaches Ⓐ where the two-stage flag F=1 is established when the switch (67) turns "on" and the two-stage flag F=0 is established when it turns "off". In a section from Ⓐ to Ⓑ, work switches are loaded. As the contents of it is work switch load, the first determined whether the change-over switch (31) is in the position of the automatic issue to establish APF=1, it is in the position of the manual issue to establish MPF=1 or it is in the position of the conveyor to establish the conveyor F=1. Next it is determined is whether the change-over switch (32) is in the position of the weighing to establish the weighing F=1, it is in the position of the print fixing position for unit cost and weight to establish IK-@WF=1 or it is in the position of the print fixing position for price to establish IK-PF=1. Subsequently, the key load of contents illustrated in FIGS. 17 and 18 is made in a section between Ⓑ and Ⓒ.

Figure 17A:
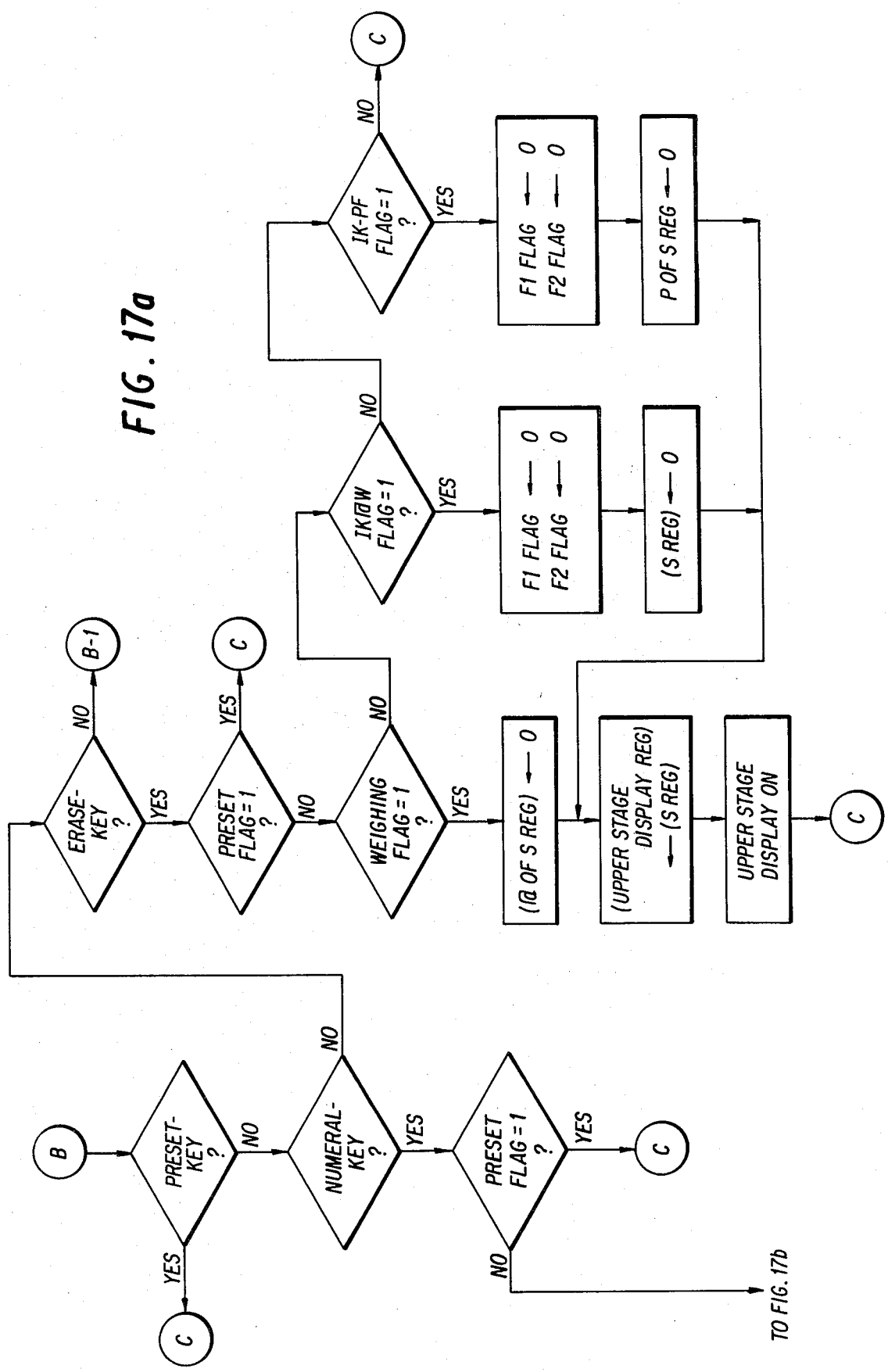
Figure 17B:
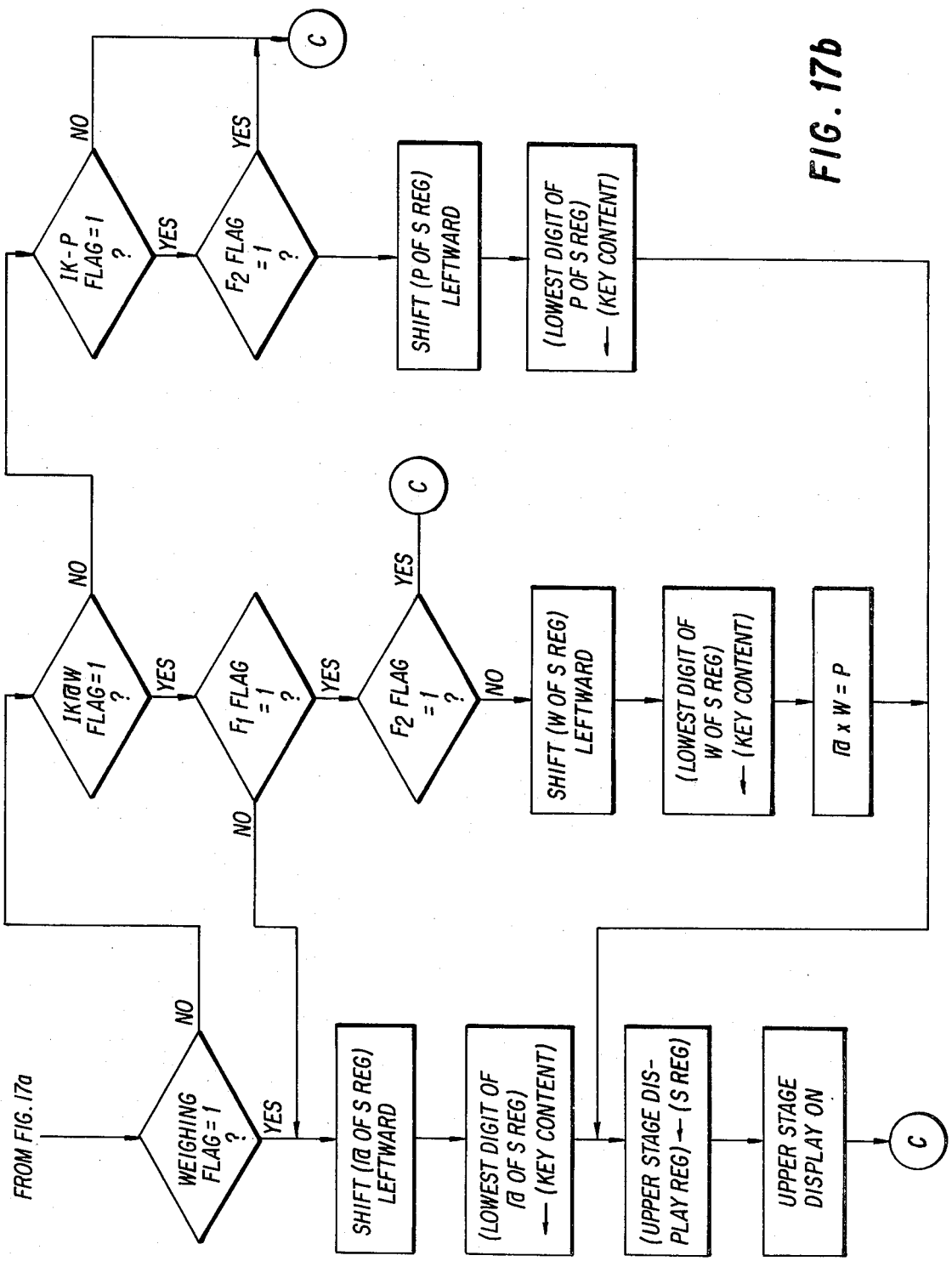
Figure 18B:
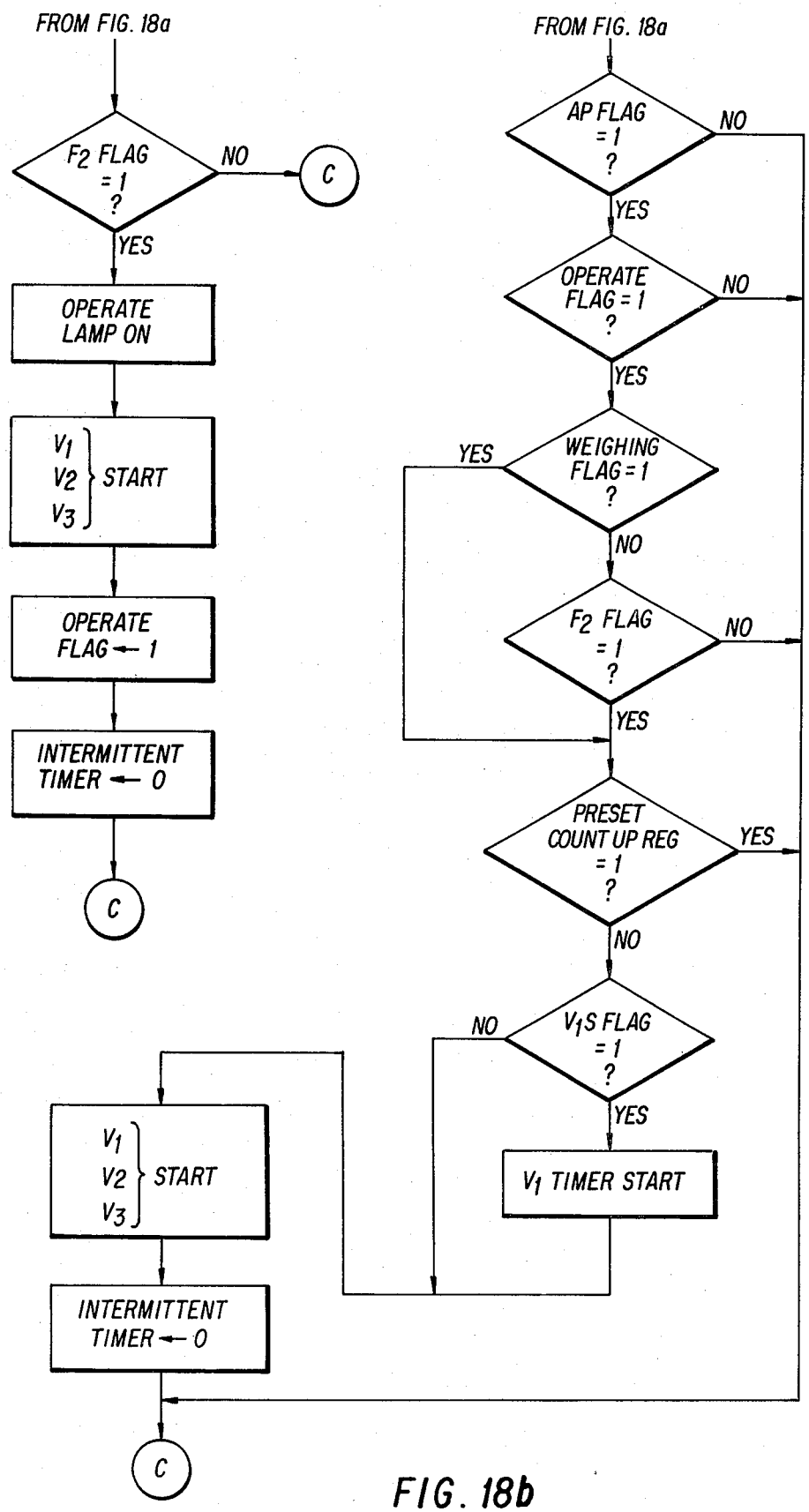
Figure 19:
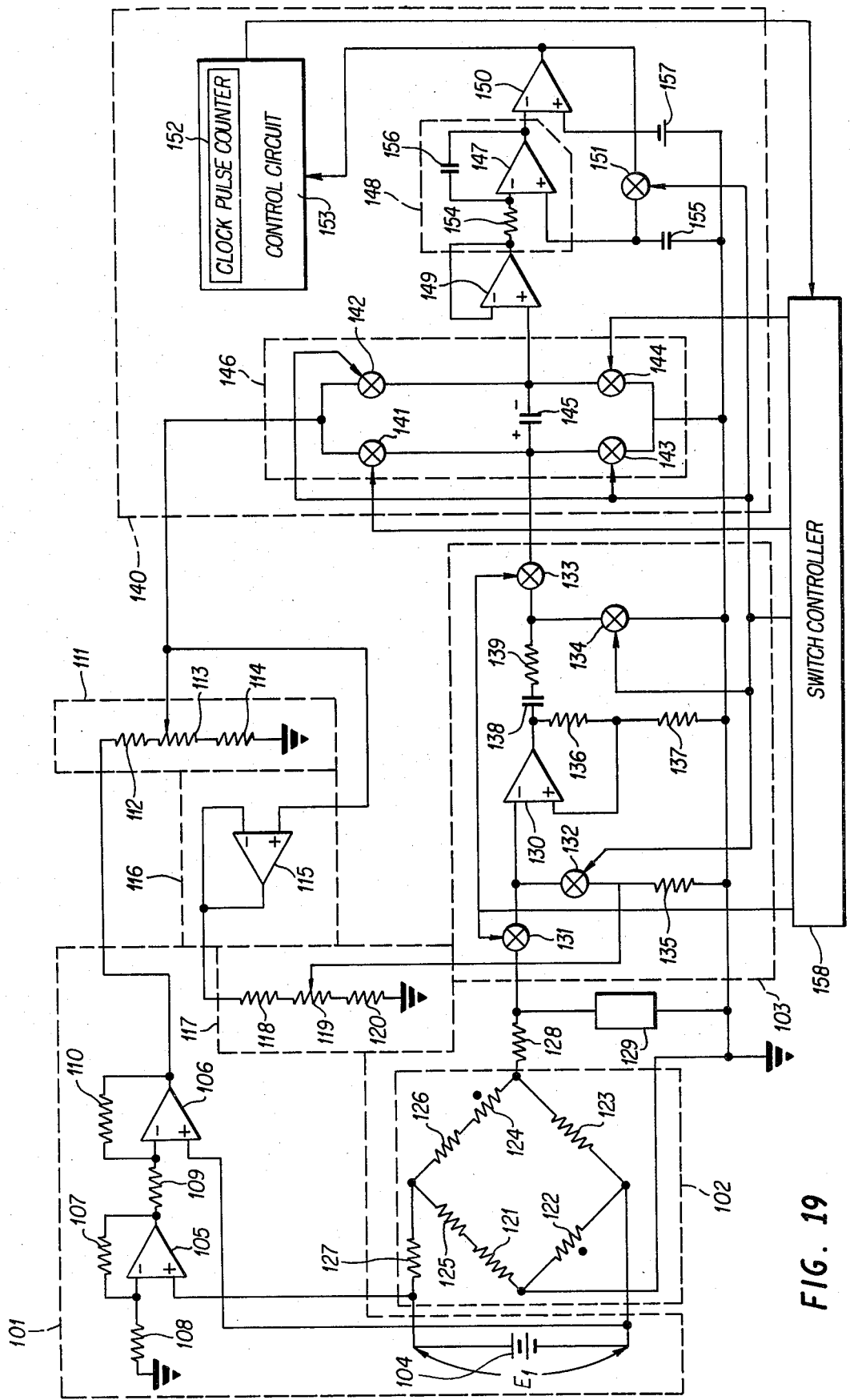
Figure 20:
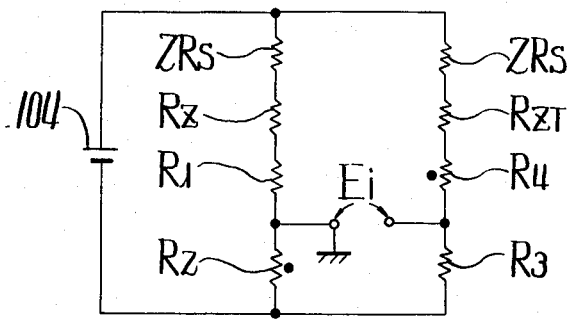
Figure 21:
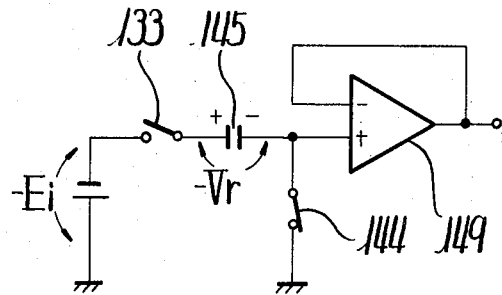
Figure 22:
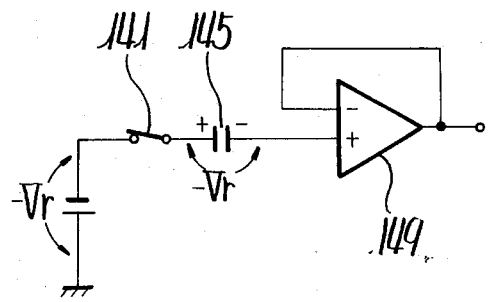
Figure 23:
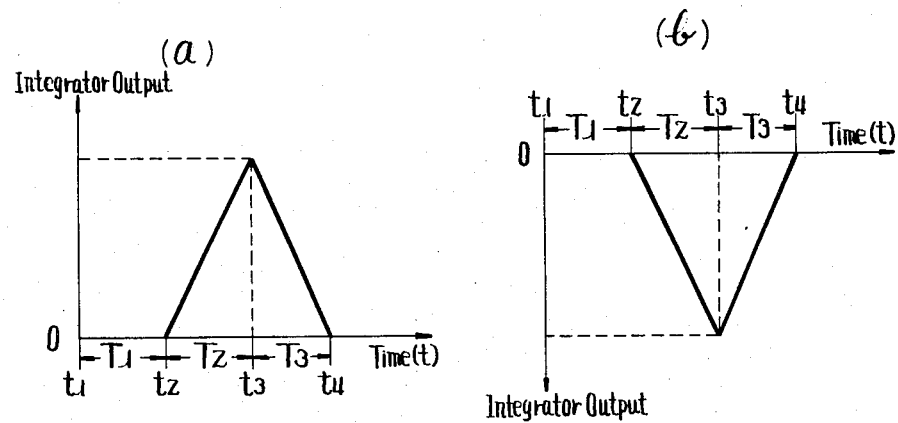
Figure 24:
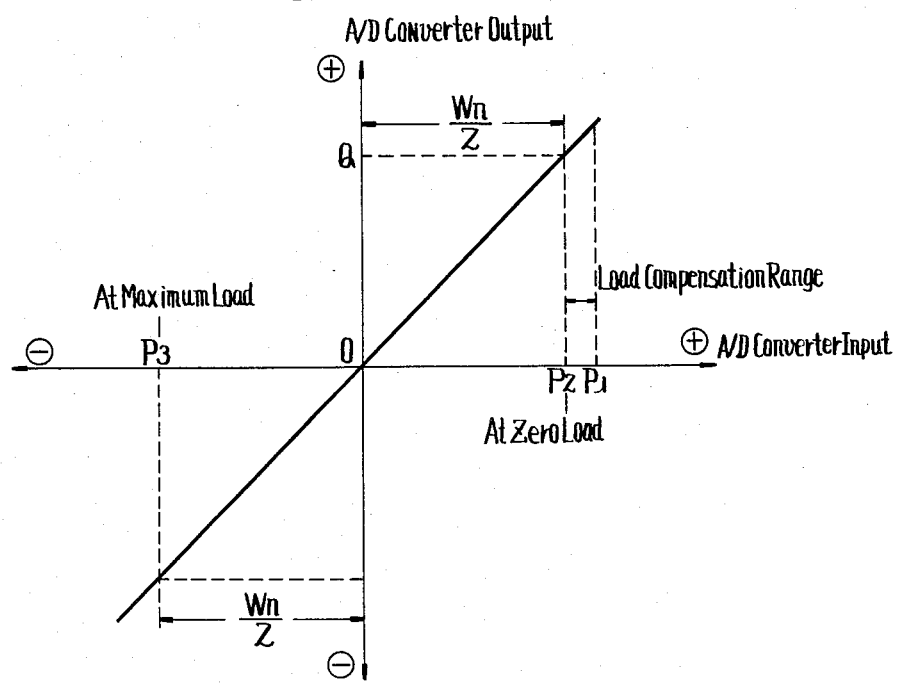
Figure 25:
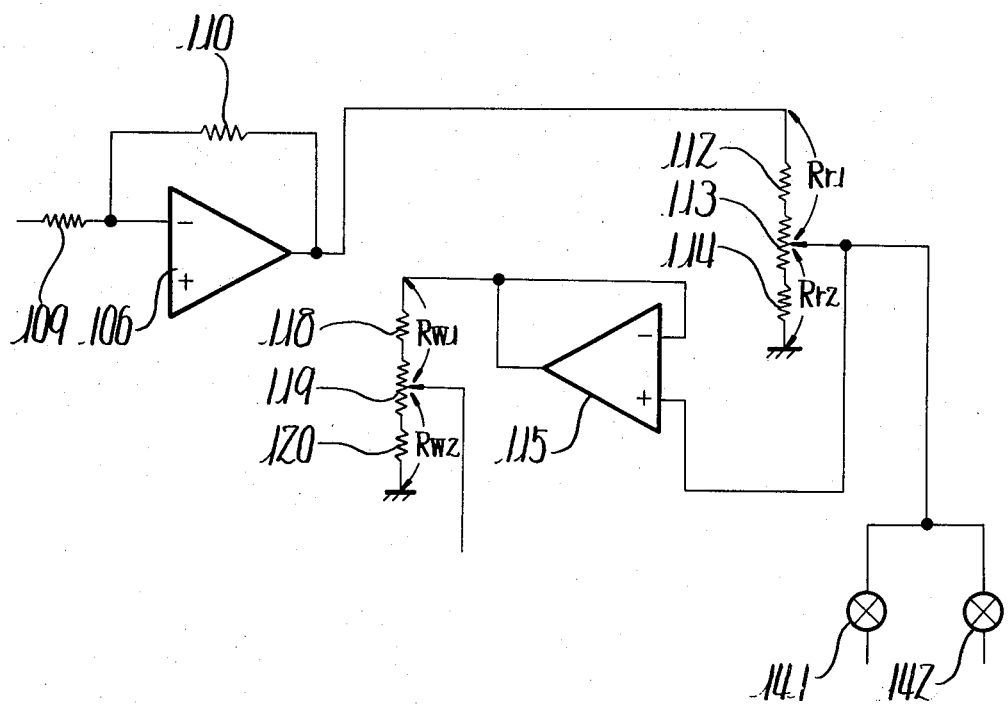

In FIG. 17, it is check if the preset key (24) has been pushed. If it has been pushed, the flow shifts to Ⓒ after necessary works have been made, and if it has not been pushed, whether the numeral key (19) has been pushed is checked. First, the state in which the numeral key (19) has been pushed will be studied. The preset F is checked, and if the present F=1 holds, the flow shifts to Ⓒ after performing the preset work, whereas if the preset F=0 holds, the weighing F is checked. If the weighing F=1, the unit cost of the S register (79) is shifted leftwards, the key content is put into the least significant digit of the S register (79) and into the upper-stage display register (80), the upper-stage display is turned "on", and the flow shifts to Ⓒ.

If the weighing F=0, IK-@WF is checked, and if this flag IK-@WF=1, F₁F is checked. When F₁F=0 holds, the same routine as in the foregoing case where the weighing F=1 holds is traced, and when F₁F=1 holds, F₂F is checked. If F₂F=1 holds, the flow shifts to C. If F₂F=0 holds, the weight W of the S register (79) is shifted leftwards, the key content is put into the least significant digit of the S register (79), the unit cost and the weight are multiplied to find the price P, and price P is put into the upper-stage display register (80), the upper-stage display is turned "on", and the flow shifts to Ⓒ.

Further, if the aforecited IK-@WF=0 holds, IK-PF is checked. If IK-PF=0 holds, the flow shifts to Ⓒ, and if IK-PF=1 holds, F₂F is checked. If F₂F=1 holds, the flow shifts to C. If F₂F=0 holds, the price P of the S register (79) is shifted leftwards, the key content is put into the least significant digit of the price of the S register (79), the resulting value is put into the upper-stage display register (80), the upper-stage display is turned "on", and the flow shifts to Ⓒ.

Referring back to the previous step, if the numeral key (19) is not pushed, the erase key (23) is checked. When the erase key (23) is not pushed, the flow falls into the state of FIG. 18 from a part indicated as (B-1).

When the erase key (23) is pushed, the preset F is checked. If the preset F=1 holds, CC-SF=0 is established, zero is put into the register (82), the content of the register (82) is put into the lower-stage display register (81), the lower-stage display is turned "on", and the flow shifts to Ⓒ. If the preset F=0 holds, the weighing F is checked. If the weighing F=1 holds, zero is put into the unit cost part of the S register (79), the resulting content is put into the upper-stage display register (80), the upper-stage display is turned "on", and the flow shifts to Ⓒ. At this time, if the weighing F=0 holds, IK-@WF is checked. If IK-@WF=1 holds, F1F=0 and F2F=0 are established, zero is put into the S register (79), the upper-stage display is made with the upper-stage display register (80) made zero, and the flow shifts to Ⓒ. If IK-@WF=0 holds, IK-PF is checked. If IK-PF=0 holds, the flow shifts to Ⓒ, and if IK-PF=1 holds, F1F=0 and F2F=0 are established, the price part of the S register (79) is made zero, it is put into the upper-stage display register (80), the upper-stage display is made, and the flow shifts to Ⓒ.

Now, when neither of the preset key (24), the numeral key (19) and the erase key (23) is pushed, the flow shifts to the state shown in FIG. 18 from the point (B-1). First, whether the execute key (20) has been pushed is checked. When the execute key (20) has been pushed, the preset F is checked. When the preset F=1 holds, necessary work is conducted, whereupon the flow shifts to the check of APF to be stated later. On the other hand, when the preset F=0 holds, IK-@WF is checked. If this IK-@WF=1 holds, F1F is checked. If F1F=0 holds, F1F=0 is established and the check state of APF to be stated later begins, and if F1F=1 holds, F2F is checked. If F2F=0 holds, F2F=1 is established and the state of APF begins, and if F2F32 1 holds, the flow shifts to Ⓒ. Further, if the aforecited IK-@WF=0 holds, IK-PF is checked. If IK-PF=0 holds, the flow shifts to Ⓒ, and if IK-PF=1 holds, F2F is checked. If F2F=1 holds, the flow shifts to Ⓒ, and if F2F=0 holds, F1F=1 and F2F=1 are established to begin the check state of APF.

Then, APF is checked. If APF=0 holds, the flow shifts to Ⓒ. If APF=1 holds, the operate F is checked. If it is zero, the flow shifts to Ⓒ, and if it is one, the weighing F is checked. If the weighing F=1 holds and the preset count-up F=1 holds, the flow shifts to Ⓒ. Also when the weighing F=0 holds and F2F= holds, the flow shifts to Ⓒ. When the weighing F=0 and F2F=1 hold, V₁SF is checked subject to the preset count-up F=0. If V₁SF=1 holds, the V₁ timer is started, and if V₁SF=0 holds, the V₁ timer start is jumped, the conveyor V₁ (1), conveyor V₂ (2) and conveyor V₃ (3) are started, the intermittent timer is made zero, and the flow shifts to Ⓒ.

When the execute key (20) is not pushed, a manual issue key, not shown, is checked. If it is Yes, which is significant of the manual issue state, the flow shifts to Ⓒ after the corresponding works have been performed. Unless the state is the manual issue, the operate/stop key (28) is checked. When this key is not pushed, works not illustrated are performed and the flow shifts to Ⓒ, and when it is pushed, APF is checked. If APF=0 holds, the flow shifts to Ⓒ via necessary works, and if APF=1 holds, the operate F is checked. If the operate F=1 holds, the operate F=0 is established, the operate lamp (47) is put out, the conveyors V₁ (1), V₂ (2) and V₃ (3) are stopped, and the flow shifts to Ⓒ. When APF=1 holds and the operate F=0 holds, F2F is checked. If F2F=0 holds, the flow shifts to ⓒ. If F2F=1 holds, the operate lamp (47) is turned "on", the conveyors $V_1$ (1), $V_2$ (2) and $V_3$ (3) are started, the operate F=1 is established, the intermittent timer is made zero, and the flow shifts to ⓒ.

In this manner, the key load and the accompanying works which are illustrated in FIGS. 17 and 18 are performed between ⓑ and ⓒ in FIG. 16. Operations after ⓒ are executed as follows. First, whether or not the intermittent timer has timed up is checked. If it has not timed up, it is subjected to +1, and if it has timed up, the conveyors $V_2$ (2) and $V_3$ (3) are stopped. More specifically, the intermittent timer counts the number of times of circulations of the program, it is subjected to +1 each time the program circulates, and its timing of time-up is the number of times of circulations for about 30 seconds. Therefore, the program is not disordered at the time-up, and the timer is reset when the $V_1$ sensor (7) has detected the commodity. Subsequently, $V_1SF$, $V_1TF$, $V_2SF$, $V_3S_1F$ and $V_3S_2F$ are successively checked. If all of these flags are zero, the routine from the check of ACLF to be stated later to the start of the load cell SL (4) are performed. If any one of them stands erect, it is jumped. ACLF is checked, and if ACLF=0 holds, ACLF=1 is established, the ACL counter is made zero and the load cell SL (4) is started, whereas if ACLF=1 holds, the load cell SL (4) is immediately started.

Subsequently, the display data F is made the display data F-2, the print ready F is made the print ready F-2, ACL-2F is made ACL-2F-2, the content of the weight count register-1 (85) is put into the weight count register-3 (86), and the check of APF is executed. If APF=0 holds, the flow shifts to ⓐ, and if APF=1 holds, whether the display data F-2 is one is checked.

When this display data F-2 stands erect, it is made zero, and the print ready F-2 is checked. If it is zero, ACL-2F-2 is checked. IF ACL-2F-2=0 holds, the flow returns to ⓐ. If ACL-2F-2=1 holds, it is made zero, and the check of $|(WC-3)-(WC-2)| \leq 20$, the check of $|(WC-3)-(ZTR)| \leq 100$ and the check of $K_1 \geq (WC-2) \geq K_2$ are sequentially performed to decide if the zero-point set value is not abnormal. If it is not abnormal, the data of the weight count register-3 (86) are put into the ZT register (84), and the weighing F is checked. If the aforecited print ready F-2=1 holds, the foregoing routine for the auto-zero processing is jumped, and the check state of the weighing F begins. If the weighing F=1 holds, the weight is reckoned from the weight count register-3 (86), the operation of $@ \times W = P$ is executed and the result is displayed, to reach a point ⓓ. From the point ⓓ, the check of the print ready F-2 is performed again. If the print ready F-2 is zero, the flow returns to ⓐ, and if it is one, the print command F is erected and the print ready F-2 is made zero to reach a point ⓔ.

Referring back to the previous step, if the display data F-2=0 holds, the print command F is checked. If the print command F=1 holds, the flow shifts to the point ⓔ, and if the print command F=0 holds, the weighing F is checked. When the weighing F=1 holds, the flow returns to ⓐ, and when the weighing F=0 holds, the print ready F-2 is checked, whereupon the flow returns to ⓐ at the print ready F-2=0 and returns to ⓓ at the print ready F-2=1.

From the point ⓔ, $V_3S_1F$ is checked. If $V_3S_1F=0$ holds, the flow returns to ⓐ, and if $V_3S_1F=1$ holds, the print command F is made zero and the two-stage print F is checked. When the two-stage print F=0 holds, that is, the print is of one stage, the print is executed and then the label feed is executed. On the other hand, in case where the two-stage print F=1 holds, that is, the print is of two stages, the $V_1$ start timer is started, the print of the first stage is executed and a subfeed corresponding to the interval of print rows is executed, and further, the print of the second stage is executed, INT $V_3S$ is reset and the label feed is executed. Subsequently, the two-stage print F is checked again. When the two-stage print F=0 holds, $V_3S_2F=1$ is established, $V_3S_1F=0$ is established, INT $V_3S$ is reset and the flow returns to ⓐ. On the other hand, when the two-stage print F=1 holds, $V_3S_2F$ is checked. If $V_3S_2F=0$ holds, it is made one, $V_3S_1F=0$ is established and the flow returns to ⓐ. If $V_3S_2F=1$ holds, the label blowing (STICK) is made, $V_3S_2F=0$ is established, the conveyor $V_3$ (3) is started and the flow returns to ⓐ.

Referring now to FIGS. 19 to 27, the operation of the load cell will be described.

Numeral 101 designates a reference voltage source, numeral 102 a load cell, and numeral 103 a d.c. amplifier. These are assembled in this case in proximity to one another and into a unitary form, and are under the same temperature condition at all times. Here, the reference voltage source 101 consists of a d.c. power source 104 and operational amplifiers 105 and 106. The anode terminal of the d.c. power source 104 is connected to the noninverting input terminal (+) of the operational amplifier 105, while the cathode terminal of the d.c. power source 104 is connected to the noninverting input terminal (+) of the operational amplifier 106. A resistor 107 is connected between the inverting input terminal (−) of the operational amplifier 105 and the output terminal thereof, and a resistor 108 is connected between the inverting input terminal of the operational amplifier 106 and the earth. A resistor 109 is connected between the output terminal of the operational amplifier 105 and the inverting input terminal (−) of the operational amplifier 106, and a resistor 110 is connected between the inverting input terminal (−) of the operational amplifier 106 and the output terminal thereof. Further, the d.c. power source 104 of the reference voltage source 101 is not grounded, and a reference voltage is obtained by the circuit of the operational amplifiers 105 and 106.

A series circuit consisting of a resistor 112, a potentiometer 113 and a resistor 114 which form a sensitivity adjustment circuit 111 is connected between the output terminal of the operational amplifier 106 and the earth. A high-impedance circuit 116 made up of an operational amplifier 115 is connected to the movable terminal of the potentiometer 113. Further, a series circuit consisting of a resistor 118, a potentiometer 119 and a resistor 120 which form a bias circuit 117 is connected between the output terminal of the high-impedance circuit 116 and the earth. More specifically, the high-impedance circuit 116 has the noninverting input terminal (+) of the operational amplifier 114 connected to the movable terminal of the potentiometer 113 and has the inverting input terminal (−) thereof connected to the output terminal of the operational amplifier 115, the output terminal of the operational amplifier 115 being connected to one end of the bias circuit 117.

The load cell 102 is made up of a bridge circuit whose four arms are resistors 121, 122, 123 and 124 attached to a weight receiving portion. The resistors 121 and 123 and the resistors 122 and 124 are disposed in the opposite arms, respectively. Here, the respective resistors 121, 122, 123 and 124 have their resistance values changed by the distortion of the weight receiving portion, and the resistors 121 and 123 are adapted to change in the decreasing direction, whereas the resistors 122 and 124 in the increasing direction. Further, in the arm in which the resistor 121 is incorporated, a resistance 125 for making adjustments so that the output voltage Ei of the load cell 102 may become a certain prescribed value when the load cell 102 has a no-load value is interposed in series with the resistor 121. In the arm in which the resistor 124 is incorporated, a resistance 126 for nullifying the temperature coefficient of the distortion resistor is interposed in series with the resistor 124. The node between the arm including the resistor 121 and the arm including the resistor 124 is connected to the anode terminal of the d.c. power source 104 through a resistor 127 for adjusting a sensitivity-temperature coefficient, while the node between the arm including the resistor 122 and the arm including the resistor 124 is connected to the cathode terminal of the d.c. power source 104. Hence, the resistance 127 serves to correct the temperature coefficient of the Young's modulus of the weight receiving member. The load cell output Ei is provided across the node a between the arm including the resistor 124 and the arm including the resistor 123 and the node b between the arm including the resistor 121 and the arm including the resistor 122. The node b is grounded.

Further, the d.c. amplifier 103 is connected between the nodes a and b through a resistance 128, and a low-pass filter 129 is connected between, and in parallel with, the load cell 102 and the d.c. amplifier 103. The low-pass filter 129 serves to eliminate an a.c. component superposed on the load cell output. The d.c. amplifier 103 consists of an operational amplifier 130 and four, (first to fourth) analog switches 131, 132, 133 and 134. The node a of the load cell 102 is connected to the noninverting input terminal (+) of the operational amplifier 130 through the resistance 128 and the first analog switch 131 in series. A series circuit consisting of the second analog switch 132 and a resistance 135 is connected between the noninverting input terminal (+) of the operational amplifier 130 and the earth. Further, a series circuit consisting of resistances 136 and 137 is connected between the output terminal of the operational amplifier 130 and the earth, and the third analog switch 133 is connected through a capacitor 138 and a resistance 139. The node between the resistances 136 and 137 is connected to the inverting input terminal (−) of the operational amplifier 130. The d.c. amplifier 103 has the output of its operational amplifier 130 delivered through the capacitor 138, the resistance 139 and the fourth analog switch 134 in series. The movable terminal of the potentiometer 119 of the bias circuit 117 is connected to the node between the second analog switch 132 and the resistance 135.

Subsequently, the output of the d.c. amplifier 103 is applied to an A/D converter 140. This A/D converter 140 is formed of a reference voltage generator 146 made up of four, (fifth to eighth) analog switches 141, 142, 143 and 144 and a capacitor 145, an integrator 148 made up of an operational amplifier 147, a buffer amplifier 149, a comparator 150, a ninth analog switch 151, a clock pulse counter 152 and a control circuit 153. Here, the reference voltage generator 146 is such that a bridge circuit is formed of the four analog switches 141, 142, 143 and 144, that the capacitor 145 is connected between the node between the analog switches 141 and 143 and the node between the analog switches 142 and 144 and that the output from the d.c. amplifier 103 is supplied to the noninverting input terminal (+) of the buffer amplifier 149 through the capacitor 145. The node between the analog switches 141 and 142 is connected to the movable terminal of the potentiometer 113 of the sensitivity adjustment circuit 111, and the node between the analog switches 143 and 144 is grounded. The output terminal of the buffer amplifier 149 and the inverting input terminal (−) thereof are short-circuited, and on the other hand, this output terminal is connected to the inverting input terminal (−) of the operational amplifier 147 through a resistance 154. A capacitor 155 is connected between the noninverting input terminal (+) of the operational amplifier 147 and the ground, and a capacitor 156 is connected between the inverting input terminal (−) and output terminal thereof. Subsequently, the output terminal of the operational amplifier 147 is connected to the inverting input terminal (−) of the comparator 150. A d.c. power source 157 whose anode lies on the earth side is connected between the noninverting input terminal (+) of the comparator 150 and the earth. The ninth analog switch 151 is connected between the output terminal of the comparator 150 and the noninverting input terminal (+) of the operational amplifier 147. The control circuit 153 is operated in accordance with the output of the comparator 150.

Numeral 158 indicates a switch controller, which is driven by the control circuit 153 to on-off control the first to ninth analog switches 131, 132, 133, 134, 141, 142, 143, 144 and 151. This, at a time $t_1$, the control circuit 153 instructs the switch controller 158 to close only the second, fourth, sixth, seventh and ninth analog switches 132, 134, 142, 143 and 151. The control circuit 153 operates in such a manner so as to keep the state for a period $T_1$ during which the clock pulse counter 152 on its own counts a predetermined number of clock pulses. At a time $t_2$ at which the period $T_1$ ends, the control circuit 153 now instructs the switch controller 158 to close only the first and third analog switches 131 and 133. The control circuit 153 then keeps the state for a period $T_2$ in which the clock pulse counter 152 on its own counts a predetermined number of clock pulses. Subsequently, immediately before the end of the period $T_2$, the control circuit 153 decides on the basis of the output of comparator 150 whether the polarity of an input voltage to the buffer amplifier 149 is positive or negative, and it transmits the result to the switch controller 158. At the timing at which the period $T_2$ ends, the switch controller 158 closes the fifth analog switch 141 when the polarity of the input voltage is positive and closes the eighth analog switch 144 when it is negative. Of course, all the other analog switches are open at this time. At a time $t_3$ at which the period $T_2$ ends, the control circuit 153 causes its own clock pulse counter 152 to count clock pulses again. This time, the counting operation is stopped on the ground that the output of the comparator 150 becomes zero. Letting the stop time be $t_4$, the number of counts counted by the clock pulse counter 152 in the period $T_3$ affords a digital weight measurement information.

Now, the operation of the apparatus having such circuit arrangement will be described. Letting the voltage of the d.c. power source 104 be $E_1$, the resistance values of the resistors 121, 122, 123 and 124 be $R_1$, $R_2$, $R_3$ and $R_4$ respectively, and the resistance values of the resistances 125, 126 and 127 be $R_Z$, $R_{ZT}$ and $R_S$ respectively, the output Ei of the load cell 102 becomes as follows from the relation of FIG. 20:

$$Ei = E_1 \cdot \left( \frac{R_3}{2R_S + R_{ZT} + R_3 + R_4} - \frac{R_2}{2R_S + R_Z + R_1 + R_2} \right) \quad (1)$$

Assuming by way of example that $R_1 = R_2 = R_3 = R_4 = R$ holds and that a resistance variation at the time when a weight has acted on the load cell 102 is $\delta$, Expression (1) becomes as follows:

$$Ei = E_1 \cdot \left( \frac{R(1-\delta)}{2R_S + R_{ZT} + R(1+\delta) + R(1-\delta)} - \frac{R(1+\delta)}{2R_S + R_Z + R(1+\delta) + R(1-\delta)} \right) \quad (2)$$

Now, supposing $R_Z \approx R_{ZT}$, Expression (2) becomes:

$$Ei = E_1 \cdot \frac{-2R \cdot \delta}{2R_S + R_{ZT} + 2R} \quad (3)$$

Here, $\delta$ is an output proportional to the weight. Therefore, letting Fn denote the rated weight of the load cell 102, F denote the load weight thereof and K denote the sensitivity thereof, $\delta = (F/Fn) \cdot K$ holds. Therefore, Expression (3) becomes:

$$Ei = \frac{-2R}{2R_S + R_{ZT} + 2R} \cdot \frac{F}{Fn} \cdot K \cdot E_1 \quad (4)$$

Putting $\frac{2R}{2R_S + R_{ZT} + 2R} = P$, it is further reduced to:

$$Ei = -P \cdot \frac{F}{Fn} \cdot K \cdot E_1 \quad (5)$$

This output Ei of the load cell 102 has the superposed a.c. component cut by the low-pass filter 129 and is applied to the d.c. amplifier 103.

Now, when the analog switches 132, 134, 142, 143 and 151 are closed by the switch controller 158 at the time $t_1$, the operational amplifier 130 in the d.c. amplifier 103 amplifies the difference voltage between the offset voltage $V_{30}$, on its own and a voltage $V_{17}$ set by the bias circuit 117, in accordance with a gain $A_1 = (1 + R_{36}/R_{37})$ determined by the resistances 136 and 137, and it provides a voltage $A_1 (V_{30} - V_{17})$. This voltage $A_1 (V_{30} - V_{17})$ is charged into the capacitor 138 by the circuit composed of the capacitor 138, the resistance 139 and the fourth analog switch 134.

On the other hand, the output of the operational amplifier 106 of the reference voltage source 101 becomes $$-(1 + A_2)(E_1 + V_6 - V_5) \text{ at } A_2 = \frac{R_{10}}{R_9} = \frac{R_8}{R_7}:$$

Accordingly, the reference voltage $-V_r$ which is supplied from the reference voltage source 101 to the reference voltage generator 146 of the A/D converter 140 becomes:

$$-V_r = (1 + A_2)(E_1 + V_6 - V_5) \cdot \frac{R_{r2}}{R_{r1} + R_{r2}} \quad (6)$$

Accordingly, when the analog switches 142 and 143 are closed at the time $t_1$, the capacitor 145 is charged with $-V_r$ in the illustrated polarity by the path consisting of the analog switch 142, the capacitor 145 and the analog switch 143. Further, since the analog switch 151 is closed at the time $t_1$, a negative feedback loop from the output terminal of the comparator 150 to the noninverting input terminal (+) of the operational amplifier 147 of the integrator 148 is formed and functions to make the differential input voltage to the operational amplifier 147 zero at all times, and the integrator 148 has its integrating operation stopped. This state is held over the period $T_1$ of from the time $t_1$ to $t_2$.

At the time $t_2$, the analog switches 132, 134, 142, 143 and 151 are opened, and the first and third analog switches 131 and 133 are closed instead. Then, the output Ei of the load cell 102 is amplified by the d.c. amplifier 103, and the output of the operational amplifier 130 becomes $A_1 \cdot (E_i + V_{30})$. The voltage $A_1 \cdot V_{30}$ has been charged in the period $T_1$ and has been held by the opening of the analog switch 134, so that the output of the d.c. amplifier 103 or the output of the third analog switch 133 becomes $A_1 \cdot (-E_i + V_{30}) - A_1 (V_{30} - V_{17}) = -A_1 \cdot (E_i - V_{17})$. This signifies that the offset voltage $V_{30}$ of the operational amplifier 130 has been removed. It is also signified that the output of the third analog switch 133 can be set arbitrarily in both the plus and minus polarities through the setting of the bias circuit 117. The output of the analog switch 133 becomes an input to the A/D converter 140, and this value changes to either plus or minus in dependence on the weight acting on the load cell 102. The signal voltage $-A_1 (E_i - V_{17})$ is applied to the A/D converter 140. Now, the voltage $-V_r$ is held in the capacitor 145 of the reference voltage generator 146. Therefore, when $-A_1 \times (E_i - V_{17})$ is collectively considered as $-Ei_o$, a voltage denoted as $(-V_r) + (-Ei_o)$ is applied to the noninverting input terminal (+) of the buffer amplifier 149. This voltage is integrated by the integrator 148 through the buffer amplifier 149.

The capacitor 155 of the A/D converter 140 has been already charged with a voltage $(-V_r + V_{47})$ because the negative feedback loop has been formed in the period $T_1$. On the other hand, in the period $T_2$, a voltage $(-V_r) + (-Ei_o) + V_{47}$ is applied to the inverting input terminal (−) of the operational amplifier 147 of the integrator 148. Accordingly, the output $V_o$ of the operational amplifier 147 becomes:

$$V_o = [\{(-Ei_o) + (-Vr) + V_{47}\} - \{(-Vr) + V_{47}\}] \times A_o = -Ei_o \cdot A_o \quad (7)$$

where $A_o$ denotes the closed loop gain of the operational amplifier 147. Accordingly, a voltage corresponding to the output of the load cell 102 is provided.

The integration by the integrator 148 is carried out over the period $T_2$ from the time $t_2$ to $t_3$. Immediately before the time $t_3$ is reached, whether the sign of the input voltage to the buffer amplifier 149 is made plus or minus by the output of the comparator 150 is sensed by the control circuit 153. That is, it is sensed whether the sign of the level integrated by the integrator 148 is plus or minus. By way of example, when the control circuit 153 has sensed that the output of the integrator 148 is made minus by the output of the comparator 150, it instructs the switch controller 158 at the timing of the time t₃ is open the first and third analog switches 131 and 133 and to close the eighth analog switch 144. This signifies that the input voltage to the buffer amplifier 149 becomes 0 (zero) volt as illustrated by an equivalent circuit in FIG. 21. On the other hand, the control circuit 153 causes the clock pulse counter 152 to start counting of the clock pulses when the time t₃ is reached. When the input voltage to the buffer amplifier 149 has become 0 (zero) volt, the voltage integrated in the integrator 148 is gradually discharged. Eventually, the voltage level becomes zero at a time t₄, and the output level of the comparator 150 becomes zero. When the output level of the comparator 150 has become zero in this manner, the control circuit 153 stops the counting operation of the clock pulses by the clock pulse counter 152. Accordingly, the clock pulse counter 152 counts the clock pulses in the period $T_3$ from the time $t_3$ to $t_4$. In this case, the period $T_3$ is proportional to the voltage level integrated by the integrator 148, and in turn, the voltage integrated by the integrator 148 is proportional to the output of the load cell 102. After all, the number of counts of the clock pulses counted in the period $T_3$ by the clock pulse counter 152 represents digitally the quantity of weight measured by the load cell 102.

When the control circuit 153 has sensed that the output of the integrator 148 is made plus by the output of the comparator 150, it instructs the switch controller 158 at the timing of the time $t_3$ to open the first and third analog switches 131 and 133 and to close the fifth analog switch 141. This signifies that the input voltage to the buffer amplifier 149 becomes $(-Vr)+(-Vr)$ volts as illustrated by an equivalent circuit in FIG. 22. Also in this case, as in the foregoing case where the integrator output is minus, the control circuit 153 starts the counting of the clock pulses at the time $t_3$. Since the signs of the input voltage $-2Vr$ to the buffer amplifier 149 and the integration output of the integrator 148 are opposite, the voltage integrated by the integrator 148 is gradually discharged by the input voltage $-2Vr$. Eventually, the voltage level becomes zero at the time $t_4$, and the output level of the comparator 150 becomes zero. Also in this case, the clock pulse counter 152 counts the clock pulses in the period $T_3$ from the time $t_3$ to $t_4$ and digitally represents the quantity of weight measured by the load cell 102. The time relationship i.e.—the integrator output in the cases where the input voltage from the load cell 102 to the A/D converters 140 are minus and plus as illustrated by graphs in (a) and (b) of FIG. 23, respectively.

The output $V_{01}$ of the integrator 148 in the period $T_2$ becomes as follows, if the charged voltage of the capacitor 156 at the time $t_2$ is zero:

$$V_{01} = -\frac{1}{C_{56}} \int_{t_2}^{t_3} \frac{Ei_o}{R_{54}} dt = \frac{Ei_o}{C_{56} \cdot R_{54}} \cdot T_2 \tag{8}$$

On the other hand, the output $V_{02}$ of the integrator 148 in the period $T_3$ becomes:

$$V_{02} = -\frac{1}{C_{56}} \int_{t_3}^{t_4} \frac{Vr}{R_{54}} dt = \frac{Vr}{C_{56} \cdot R_{54}} \cdot T_3 \tag{9}$$

Since $V_{01} = V_{02}$, $$\frac{Ei_o}{C_{56} \cdot R_{54}} \cdot T_2 = \frac{-Vr}{C_{56} R_{54}} \cdot T_3$$

$$T_3 = -\frac{Ei_o}{Vr} \cdot T_2 \tag{10}$$

Here, $Ei_o = A_1 \cdot Ei$, $Ei = -P \cdot \frac{F}{Fn} \cdot K \cdot E_1$ and $Vr =$ $(1 + A_2)(E_1 + V_6 - V_5)\frac{Rr_2}{Rr_1 + Rr_2}$. Therefore, $$T_3 = \frac{-A_1 \cdot \frac{F}{Fn} \cdot K \cdot E_1 \cdot P}{-(1 + A_2)(E_1 + V_6 - V_5) \cdot \frac{Rr_2}{Rr_1 + Rr_2}} \cdot T_2 \tag{11}$$

When $(V_6-V_5)$ is negligible relative to the voltage per count of the counter 152, the following is obtained:

$$T_3 \approx \frac{A_1}{1 + A_2} \cdot P \cdot \frac{F}{Fn} \cdot K \cdot E_1 \cdot \left(1 + \frac{Rr_1}{Rr_2}\right) \tag{12}$$

As stated previously, the A/D converter 140 for use in this apparatus operates in reply to both the plus and minus input voltages. The potentiometer 119 of the bias current 117 is accordingly adjusted, for example, so that the input voltage level to the A/D converter 140 may become just zero when the weight of just ½ of the maximum weight Wn, i.e., Wn/2 acts on the load cell 102. This is shown by a graph as given in FIG. 24. More specifically, the bias circuit 117 is adjusted so that the input to the A/D converter 140 may become P₂ when the weight on the load cell 102 is zero, that the input to the A/D converter 140 may become zero when the weight on the load cell 102 is Wn/2 and that the input to the A/D converter 140 may become P₃ when the weight on the load cell 102 is the maximum value Wn. The correction range of the initial weights of a receptacle etc. for the load cell 102 is set at P₁–P₂ in terms of the input level to the A/D converter 140. Thus, the A/D converter 140 is permitted to operate in response to inputs in the range of P₁ to P₃, namely, the range of both the plus and minus signs. By way of example, in case where the A/D converter 140 is operated unipolarly, input voltages to the A/D converter 140 are restricted to ranges of 0–P₂ and 0–P₃ with respect to the weight Wn. This leads to the problem that, as the load cell 102, one of high sensitivity which provides a great output in reply to a weight cannot be used. In contrast, according to this apparatus, as the A/D converter 140 one which can operate in the range of the plus sign–minus sign or the range of P₁–P₃ is used, and the A/D converter 140 is effectively operated in reply to the load cell 102 by employing the bias circuit 117, and hence, one of high sensitivity can be used as the load cell 102 and a weight measurement of high precision can be executed.

Simultaneously, according to this apparatus, the sensitivity adjustment of the A/D converter 140 can be performed in the state in which the number of counts at the operating point of the A/D converter 140 is held substantially constant. More specifically, the voltage to be supplied to the bias circuit 117 is applied through the operational amplifier 115 from the sensitivity adjustment circuit 111 for the A/D converter 140. Therefore, even when the sensitivity of the A/D converter 140 (the gradient of the graph shown in FIG. 24) is adjusted by the sensitivity adjusting circuit 111, the number of counts Nr(Q) at the point Q of the A/D converter 140 does not change considerably and is held substantially constant. Letting $E_{L(Z)}$ denote a load cell output based on the initial weight, $E_{L(B)}$ denote a load cell output based on the zero balance, $N_S$ denote the number of counts of the counter 152 in the signal integration period $T_3$ of the A/D converter 140, $R_w$ denote $R_{w1}/(R_{w1}+R_{w2})$, $R_r$ denote $R_{r2}/(R_{r1}+R_{r2})$, and $A_2 \cdot E_1 \cdot R_w$ denote a voltage applied in order to set the point Q of the A/D converter 140, the number of counts Nr(Q) at the point Q being the operating point of the A/D converter 140 becomes:

$$Nr(Q) = \frac{A_1\{E_{L(Z)} \pm E_{L(B)} - (A_2 \cdot E_1 \cdot R_r)(A_3 \cdot R_w)\}}{A_2 \cdot E_1 \cdot R_r} \times N_S \quad (13)$$

$$= \left\{ \frac{A_1(E_{L(Z)} \pm E_{L(B)})}{A_2 \cdot E_1 \cdot R_r} \times N_S \right\} - \{A_1 \cdot A_3 \cdot R_w \cdot N_S\}$$

where $A_3$ denotes the gain of the operational amplifier 115. In Expression (13), the first term or $$\frac{A_1(E_{L(Z)} \pm E_{L(B)})}{A_2 \cdot E_1 \cdot R_r} \times N_S$$

is a part concerning the output of the load cell 102, and $A_1 \cdot A_3 \cdot R_w \cdot N_S$ being the second term is a part concerning the voltage applied in order to set the point Q, and (first term) < (second term) holds. $R_r$ is not included in the second term. Accordingly, even when the potentiometer 113 of the sensitivity adjusting circuit 111 is operated to vary $R_r$, the second term remains constant without changing. On the other hand, when the first term is noted, $E_{L(B)}$ which is the output of the load cell 102 based on the zero balance can be adjusted by means of the resistance 125 of the load cell 102. Accordingly, $E_{L(Z)} \pm E_{L(B)} \approx 0$ can be established by properly adjusting the resistance 125. When $E_{L(B)}$ is thus set, the numerator of the first term in Expression (13) becomes substantially zero, so that the variation of $R_r$ hardly changes the first term. To establish $E_{L(Z)} \pm E_{L(B)} \approx 0$ is to adjust the load cell output into zero under the state under which the initial weights of the receptacle etc. act on the load cell 102.

As thus far described, this apparatus brings forth the various advantages. However, in case where, while using the apparatus, the operation of the A/D converter 140 needs to be controlled from the operating state into the stop state or vice versa with an external signal, a disadvantage to be now described is involved in the operation. In the circuit shown in FIG. 19, charges in the capacitors 138, 145 and 155 for storing analog voltages are discharged in the stop state. Therefore, when the A/D converter 140 is put from the stop state into the operating state, the A/D conversion cannot be executed at a desired precision.

This invention has been made in view of such drawback, and has for its object to provide an A/D converter control method in a weight measuring apparatus wherein the operation and stop of an A/D converter is controlled with an external signal while using the apparatus as stated previously, characterized in that in case of bringing the A/D converter from a stop state into an operating state, the interior of a circuit is reset once, an A/D conversion being thereafter executed, whereby the A/D conversion can be performed at a desired precision.

Figure 26:
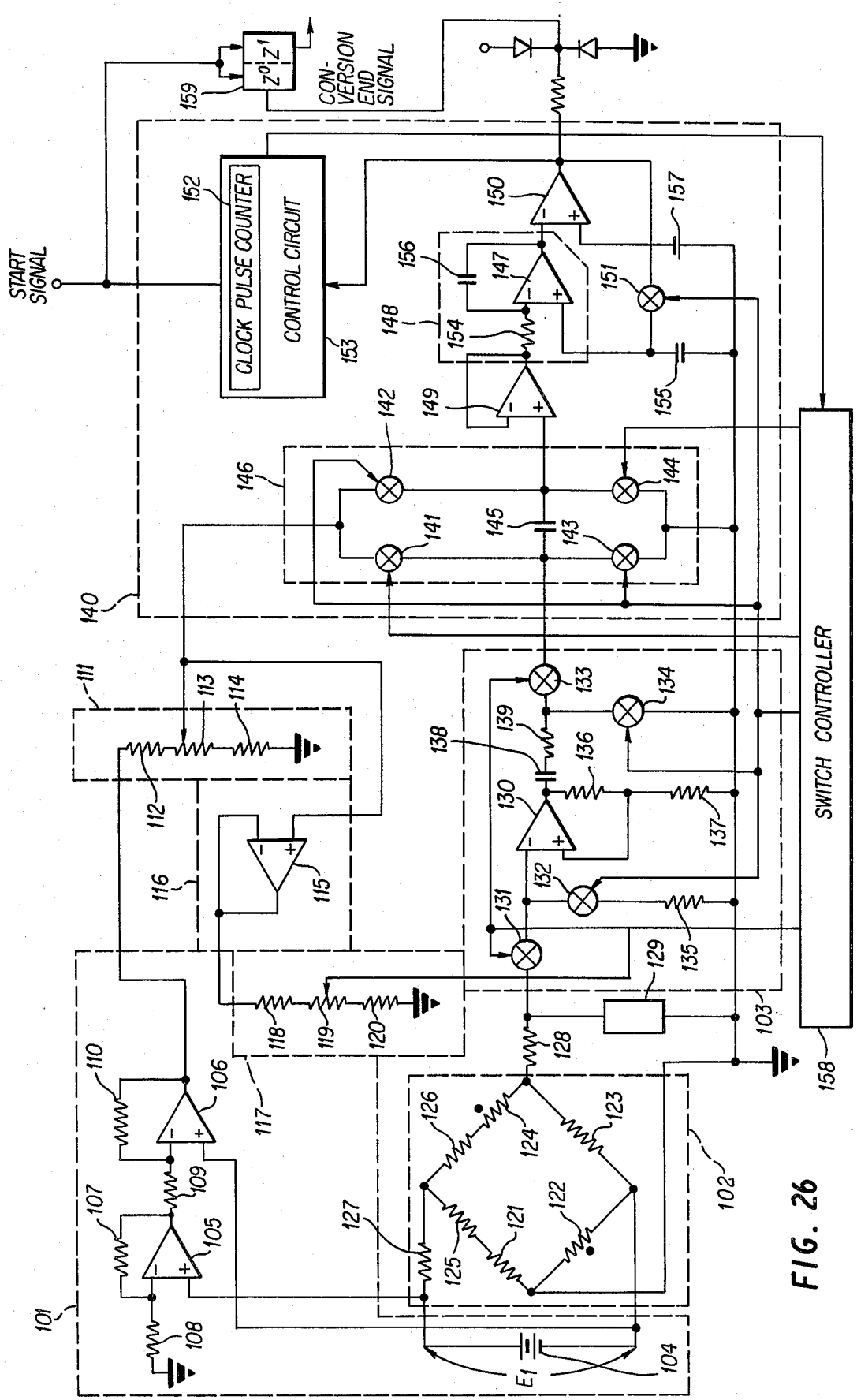
FIG. 26 is a circuit diagram showing an embodiment of a load cell according to this invention.
Figure 27:
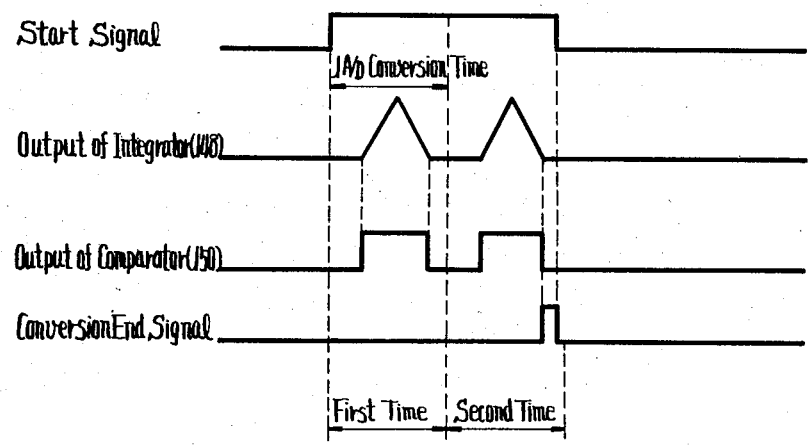
FIG. 27 is a timing chart of the embodiment.

An embodiment of this invention will be described with reference to FIGS. 26 and 27. The same parts as those shown in FIGS. 19 to 25 are assigned the same symbols and will not be repeatedly explained. As illustrated in FIG. 26, a start signal is applied to the control circuit 153 in the A/D converter 140. A counter 159 of two bits for indicating that the A/D converter 140 has performed the A/D conversion twice on the basis of the start signal is connected on the output side of the comparator 150. A conversion end signal is provided from the second bit of the counter 159.

Assuming first that the start signal is at an L level, the control circuit 153 stops without performing the next A/D conversion operation at the time when the operation of one cycle of the A/D conversion has ended. On the other hand, assuming the start signal to be at an H level, the control circuit 153 starts operating and performs the A/D conversion operation, and it successively executes the A/D conversion operations of the next cycles during the period of the H level. Therefore, when the start signal is changed from the L level to the H level, the A/D conversion operation commences, and the A/D converter 140 is refreshed by this first A/D conversion. When the first one cycle of the A/D conversion has ended, the comparator 150 becomes operative. Outputs from the comparator are applied to the counter 159, and the number of times by which the comparator 150 has operated is counted. When the number of counts has become 2 (two), the conversion end signal is delivered from the counter 159. Accordingly, the delivery of the conversion end signal indicates that data owing to the second A/D conversion are accurate data. The counter 159 is reset when the start signal has become the L level. On the side controlling the A/D converter 140, the start signal is put into the H level and is then put into the L level after the conversion and signal has been received, whereby the A/D converter 140 can be held in the stop state. A chart of these timings is shown in FIG. 27.

In this manner, the two A/D conversions are performed by the A/D converter 140 on the basis of the start signal, the A/D converter 140 is updated by the first A/D conversion and the data owing to the second A/D conversion are made effective, whereby the A/D conversion can be executed at a desired precision in case of bringing the A/D converter from the stop state to the operating state.

Although, in this embodiment, the conversion end signal is provided by disposing the counter 159, it is not always necessary to dispose the counter 159 or the like, but any means to effectuate the data of the second A/D conversion may be adopted.

I claim:

1. In a full-auto labeling system having a sending-in conveyor; a weighing conveyor to which a load cell is joined; a sticking conveyor which is disposed along a label printer equipped with a sticking mechanism are disposed in alignment, whereby the three conveyors have their operations controlled independently of one another; and sensors for detecting a commodity on said conveyors are disposed for each respective conveyor, whereby operations of said load cell and the respective conveyors are controlled by combinations of outputs of said sensors and short-time timers, the improvement comprising load cell starting means which starts said load cell operation every predetermined time period during a time interval when there is no output from said sensor of said weighing conveyor characterized in that even when no output of the sensor exists, said load cell is started every predetermined period.

2. The improved full-auto labeling system according to claim 1, wherein the operation of said load cell is stopped by the output of said sensor of said sending-in conveyor, while said load is started by the output of said sensor of said weighing conveyor.

3. The improved full-auto labeling system according to claim 1, characterized in that in a print fixing operation in which a print contact for a label is fixed, a start signal is impressed on said load cell by the output of said sensor of said weighing conveyor.

4. The improved full-auto labeling system according to claim 1, wherein said load cell further include A/D conversion means which is operated by said starting means and is executed twice every start signal.

5. The improved full-auto labeling system according to claim 1 or claim 4, characterized in that measurement data are not taken with a signal based on the first of said twice executed A/D conversion of said load cell, but are taken with a signal based on the second of said twice executed A/D conversions.

6. The improved full-auto labeling system according to claim 1 or claim 4, characterized in that an A/D converter is refreshed with a signal based on the first of said twice executed A/D conversions of said load cell, while measurement data are taken with a signal based on the second of said twice executed A/D conversions.

* * * * *